(12) United States Patent
Lampe-Onnerud

(10) Patent No.: US 8,828,605 B2
(45) Date of Patent: Sep. 9, 2014

(54) LITHIUM-ION SECONDARY BATTERY

(75) Inventor: Christina M. Lampe-Onnerud, Framingham, MA (US)

(73) Assignee: Boston-Power, Inc., Westborough, MA (US)

( * ) Notice: Subject to any disclaimer, the term of this patent is extended or adjusted under 35 U.S.C. 154(b) by 974 days.

(21) Appl. No.: 12/942,399

(22) Filed: Nov. 9, 2010

(65) Prior Publication Data
US 2011/0052966 A1 Mar. 3, 2011

Related U.S. Application Data

(63) Continuation of application No. 11/821,102, filed on Jun. 21, 2007, now abandoned, which is a continuation of application No. PCT/US2005/047383, filed on Dec. 23, 2005.

(60) Provisional application No. 60/639,275, filed on Dec. 28, 2004, provisional application No. 60/680,271, filed on May 12, 2005, provisional application No. 60/699,285, filed on Jul. 14, 2005.

(51) Int. Cl.
| | |
|---|---|
| *H01M 4/58* | (2010.01) |
| *H01M 4/505* | (2010.01) |
| *H01M 4/485* | (2010.01) |
| *H01M 10/0525* | (2010.01) |
| *H01M 4/525* | (2010.01) |
| *H01M 4/36* | (2006.01) |
| *H01M 10/42* | (2006.01) |
| *H01M 4/02* | (2006.01) |

(52) U.S. Cl.
CPC .......... *H01M 4/525* (2013.01); *H01M 10/4235* (2013.01); *Y02E 60/122* (2013.01); *H01M 4/505* (2013.01); *H01M 4/485* (2013.01); *H01M 10/0525* (2013.01); *H01M 4/5825* (2013.01); *H01M 2004/028* (2013.01); *H01M 4/364* (2013.01)
USPC ..................... 429/231.1; 429/231.3; 429/223; 429/224; 429/221; 252/182.1; 252/521.2

(58) Field of Classification Search
CPC ..... H01M 4/131; H01M 4/364; H01M 4/485; H01M 4/505; H01M 4/525; H01M 4/5825; H01M 10/0525; H01M 10/4235; H01M 2004/028; Y02E 60/122
See application file for complete search history.

(56) References Cited

U.S. PATENT DOCUMENTS

| | | | |
|---|---|---|---|
| 4,028,478 A | 6/1977 | Tucholski | |
| 4,567,121 A | 1/1986 | Gilmour | |
| 5,504,415 A | 4/1996 | Podrazhansky et al. | |
| 5,565,756 A | 10/1996 | Urbish | |
| 5,567,539 A | 10/1996 | Takahashi et al. | |
| 5,677,083 A | 10/1997 | Tomiyama | |
| 5,683,634 A | 11/1997 | Fujii et al. | |
| 5,694,021 A | 12/1997 | Morioka et al. | |
| 5,879,834 A | 3/1999 | Mao | |
| 5,883,498 A | 3/1999 | Van Beek et al. | |
| 5,993,998 A | 11/1999 | Yasuda | |
| 6,033,797 A | 3/2000 | Mao et al. | |
| 6,074,523 A | 6/2000 | Mizobuchi et al. | |
| 6,087,036 A | 7/2000 | Rouillard et al. | |
| 6,114,835 A | 9/2000 | Price | |
| 6,159,636 A | 12/2000 | Wang et al. | |
| 6,204,635 B1 | 3/2001 | Sullivan | |
| 6,232,015 B1 | 5/2001 | Wyser | |
| 6,265,107 B1 | 7/2001 | Shimizu et al. | |
| 6,267,943 B1 | 7/2001 | Manev et al. | |
| 6,333,128 B1 | 12/2001 | Sunagawa et al. | |
| 6,346,344 B1 | 2/2002 | Song et al. | |
| 6,395,426 B1 | 5/2002 | Imachi et al. | |
| 6,482,550 B1 | 11/2002 | Imachi et al. | |
| 6,521,379 B2 | 2/2003 | Nishida et al. | |
| 6,534,216 B1 | 3/2003 | Narukawa et al. | |
| 6,551,744 B1 | 4/2003 | Ohzuku et al. | |

(Continued)

FOREIGN PATENT DOCUMENTS

| | | |
|---|---|---|
| CN | 1372341 | 10/2002 |
| CN | 1435908 | 8/2003 |

(Continued)

OTHER PUBLICATIONS

Office Action dated May 12, 2014 for U.S. Appl. No. 12/880,883.

(Continued)

*Primary Examiner* — Raymond Alejandro
(74) *Attorney, Agent, or Firm* — Hamilton, Brook, Smith & Reynolds, P.C.

(57) ABSTRACT

In one embodiment, an active cathode material comprises a mixture that includes: at least one of a lithium cobaltate and a lithium nickelate; and at least one of a manganate spinel represented by an empirical formula of $Li_{(1+x1)}(Mn_{1-y1}A'_{y1})_{2-x1}O_{z1}$ and an olivine compound represented by an empirical formula of $Li_{(1-x2)}A''_{x2}MPO_4$. In another embodiment, an active cathode material comprises a mixture that includes: a lithium nickelate selected from the group consisting of $LiCoO_2$-coated $LiNi_{0.8}Co_{0.15}Al_{0.05}O_2$, and $Li(Ni_{1/3}Co_{1/3}Mn_{1/3})O_2$; and a manganate spinel represented by an empirical formula of $Li_{(1+x7)}Mn_{2-y7}O_{z7}$. A lithium-ion battery and a battery pack each independently employ a cathode that includes an active cathode material as described above. A method of forming a lithium-ion battery includes the steps of forming an active cathode material as described above; forming a cathode electrode with the active cathode material; and forming an anode electrode in electrical contact with the cathode via an electrolyte. A system comprises a portable electronic device and a battery pack or lithium-ion battery as described above.

23 Claims, 7 Drawing Sheets

(56) References Cited

U.S. PATENT DOCUMENTS

| | | |
|---|---|---|
| 6,582,854 B1 | 6/2003 | Qi et al. |
| 6,653,021 B2 | 11/2003 | Kweon et al. |
| 6,677,080 B2 | 1/2004 | Tanizaki et al. |
| 6,677,082 B2 | 1/2004 | Thackeray et al. |
| 6,682,850 B1 | 1/2004 | Numata et al. |
| 6,746,800 B1 | 6/2004 | Sunagawa et al. |
| 6,767,667 B1 | 7/2004 | Ooshima |
| 6,808,848 B2 | 10/2004 | Nakanishi et al. |
| 6,818,351 B2 | 11/2004 | Sunagawa et al. |
| 7,014,954 B2 | 3/2006 | Yamaguchi et al. |
| 7,138,207 B2 | 11/2006 | Yamaguchi et al. |
| 7,198,871 B2 | 4/2007 | Kitao et al. |
| 7,258,948 B2 | 8/2007 | Miyamoto et al. |
| 7,309,546 B2 | 12/2007 | Kweon et al. |
| 7,338,734 B2 | 3/2008 | Chiang et al. |
| 7,402,360 B2 | 7/2008 | Imachi et al. |
| 7,763,386 B2 | 7/2010 | Hosoya et al. |
| 8,148,946 B2 | 4/2012 | Takeda et al. |
| 2001/0020927 A1 | 9/2001 | Ikawa et al. |
| 2002/0004169 A1 | 1/2002 | Yamada et al. |
| 2002/0012841 A1 | 1/2002 | Kurose et al. |
| 2002/0061443 A1 | 5/2002 | Nakanishi et al. |
| 2002/0192552 A1 | 12/2002 | Lampe-Onnerud et al. |
| 2002/0192556 A1 | 12/2002 | Lampe-Onnerud et al. |
| 2003/0001578 A1 | 1/2003 | Lam |
| 2003/0054251 A1 | 3/2003 | Ohzuku et al. |
| 2003/0073002 A1 | 4/2003 | Imachi et al. |
| 2003/0087154 A1 | 5/2003 | Ohzuku et al. |
| 2003/0138699 A1 | 7/2003 | Kweon et al. |
| 2003/0148183 A1 | 8/2003 | Yamasaki |
| 2003/0152830 A1 | 8/2003 | Eaves |
| 2003/0170540 A1 | 9/2003 | Ohzuku et al. |
| 2003/0180615 A1 | 9/2003 | Johnson et al. |
| 2003/0180616 A1 | 9/2003 | Johnson et al. |
| 2004/0058243 A1 | 3/2004 | Ohzuku et al. |
| 2004/0058244 A1 | 3/2004 | Hosoya et al. |
| 2004/0081888 A1 | 4/2004 | Thackeray et al. |
| 2004/0091778 A1* | 5/2004 | Ozaki et al. .............. 429/231.1 |
| 2004/0096743 A1 | 5/2004 | Okae et al. |
| 2004/0121234 A1 | 6/2004 | Le |
| 2004/0126660 A1 | 7/2004 | Ohzuku et al. |
| 2004/0197650 A1 | 10/2004 | Kubota et al. |
| 2004/0197654 A1 | 10/2004 | Barker et al. |
| 2004/0202933 A1 | 10/2004 | Yamaki et al. |
| 2005/0026040 A1 | 2/2005 | Thackeray et al. |
| 2005/0077878 A1 | 4/2005 | Carrier et al. |
| 2005/0079416 A1 | 4/2005 | Ohzuku et al. |
| 2005/0084765 A1* | 4/2005 | Lee et al. ................ 429/329 |
| 2005/0118511 A1* | 6/2005 | Park et al. ................ 429/324 |
| 2005/0142442 A1 | 6/2005 | Yuasa et al. |
| 2005/0147889 A1 | 7/2005 | Ohzuku et al. |
| 2005/0170250 A1 | 8/2005 | Ohzuku et al. |
| 2005/0186474 A1 | 8/2005 | Jiang et al. |
| 2005/0206347 A1 | 9/2005 | Seo et al. |
| 2005/0214634 A1 | 9/2005 | Kim |
| 2005/0233217 A1 | 10/2005 | Fujihara et al. |
| 2006/0028183 A1 | 2/2006 | Izawa et al. |
| 2006/0035151 A1 | 2/2006 | Kumeuchi et al. |
| 2006/0051666 A1 | 3/2006 | Kim |
| 2006/0063073 A1 | 3/2006 | Kawashima |
| 2006/0222936 A1 | 10/2006 | Yamaguchi et al. |
| 2006/0251930 A1 | 11/2006 | Kim |
| 2006/0257745 A1 | 11/2006 | Choi et al. |
| 2006/0286447 A1 | 12/2006 | Kim |
| 2007/0018780 A1 | 1/2007 | Furukawa et al. |
| 2007/0026315 A1 | 2/2007 | Lampe-Onnerud et al. |
| 2007/0082265 A1 | 4/2007 | Itou et al. |
| 2007/0111098 A1 | 5/2007 | Yang Kook et al. |
| 2007/0120537 A1 | 5/2007 | Yamamoto |
| 2009/0167238 A1 | 7/2009 | McBee |

FOREIGN PATENT DOCUMENTS

| | | |
|---|---|---|
| CN | 1493522 | 5/2004 |
| CN | 1495945 | 5/2004 |
| CN | 1700498 | 11/2005 |
| CN | 1728436 A | 2/2006 |
| CN | 1262532 | 8/2008 |
| EP | 0 762 521 A2 | 3/1997 |
| EP | 0 949 702 A1 | 10/1999 |
| EP | 0 973 217 A2 | 1/2000 |
| EP | 0 999 604 A1 | 5/2000 |
| EP | 1 022 792 A1 | 7/2000 |
| EP | 0 997 957 B1 | 8/2001 |
| EP | 1 237 213 A2 | 9/2002 |
| EP | 1 296 391 A1 | 3/2003 |
| EP | 1 309 022 A2 | 5/2003 |
| EP | 1 309 022 A3 | 5/2003 |
| EP | 0 949 702 B1 | 8/2003 |
| EP | 1 383 183 A1 | 1/2004 |
| EP | 1 100 133 A2 | 5/2004 |
| EP | 1 487 039 A1 | 12/2004 |
| EP | 1 538 686 A1 | 6/2005 |
| EP | 1 885 011 A1 | 2/2008 |
| EP | 1 885 011 A2 | 2/2008 |
| JP | 02-270268 | 4/1989 |
| JP | 5082131 | 4/1993 |
| JP | 11 003698 A | 1/1999 |
| JP | 2000-012030 | 1/2000 |
| JP | 2000-37821 | 2/2000 |
| JP | 02-289175 | 3/2001 |
| JP | 2001-155693 | 6/2001 |
| JP | 2001-195353 A | 7/2001 |
| JP | 2001 22993 | 8/2001 |
| JP | 2001-243943 A | 9/2001 |
| JP | 2001-319647 | 11/2001 |
| JP | 2001328818 | 11/2001 |
| JP | 2002-042815 | 2/2002 |
| JP | 2002 042816 A | 2/2002 |
| JP | 2002-075369 A | 3/2002 |
| JP | 2002 075369 A | 3/2002 |
| JP | 2002-124257 | 4/2002 |
| JP | 2002216745 | 8/2002 |
| JP | 2002251996 | 9/2002 |
| JP | 2002-359009 | 12/2002 |
| JP | 2003 168430 A | 6/2003 |
| JP | 2003-197180 | 7/2003 |
| JP | 2004-006094 A | 1/2004 |
| JP | 2004 006094 A | 1/2004 |
| JP | 2006-156268 | 1/2004 |
| JP | 2004-179019 | 6/2004 |
| JP | 2004207120 A | 7/2004 |
| JP | 2004 259675 A | 9/2004 |
| JP | 2005-197144 | 9/2004 |
| JP | 2006-156032 | 11/2004 |
| JP | 2006-40879 | 2/2006 |
| JP | 2008525973 A | 7/2008 |
| KR | 2000052412 | 8/2000 |
| WO | WO 98/24131 A | 6/1998 |
| WO | WO 99/53556 | 10/1999 |
| WO | WO 02/078105 A1 | 10/2002 |
| WO | WO 03/026047 A1 | 3/2003 |
| WO | WO 03/075376 A1 | 9/2003 |
| WO | WO 03/092099 A1 | 11/2003 |
| WO | WO 2004/019433 A1 | 3/2004 |
| WO | WO 2004/097964 A2 | 11/2004 |
| WO | WO 2004/105162 A | 12/2004 |
| WO | WO 2004/105162 A1 | 12/2004 |
| WO | WO 2005/031892 A2 | 4/2005 |
| WO | WO 2006/071972 A2 | 7/2006 |
| WO | WO 2007/072759 A1 | 6/2007 |

OTHER PUBLICATIONS

English Translation of Decision of Rejection for Chinese Patent Application No. 200580045007.4 filed on Dec. 23, 2005, now Patent No. ZL200580040074.

Deng, B., et al., "Greatly improved elevated-temperature cycling behavior of Li1+xMgyMn2-x-yO4δ spincls with controlled oxygen stiochiometry," Electrochimica Acta (49)11:1823-1830 (2004).

(56) References Cited

OTHER PUBLICATIONS

Ohzuku, T., et al., "Electrochemistry of Manganese Dioxide in Lithium Nonaqueous Cell," J. Electrochemical Society, (137)3:769-775 (Mar. 1, 1990).
Cho, J., et al., "Zero-Strain Intercalation Cathode for Rechargeable Li-Ion Cell," Angew.Chem. Int. Ed. (40)18:3367-3367 (2001).
Office Action, Date of Mailing: Dec. 18, 2009, U.S. Appl. No. 12/317,487.
Notice of Allowance, Date of Mailing: Jun. 11, 2010, U.S. Appl. No. 12/317,487.
Office Action, Date of Mailing: Mar. 30, 2010, U.S. Appl. No. 11/485,068.
Notice of Allowance, Date of Mailing: Jun. 11, 2010, U.S. Appl. No. 11/485,068.
Kim, Y., "Suppression of Cobalt Dissolution from the $LiCoO_2$ Cathodes with Various Metal-Oxide Coatings", Journal of Electrochemical Society, 150 (12) A1723-A1725 (2003).
Invitation to Pay Additional Fees and, Where Applicable, Protest Fee (with Partial International Search) for Int'l Application No. PCT/US2009/040845; Date Mailed: Oct. 2, 2009.
Notification of Transmittal of the International Search Report and the Written Opinion of the International Searching Authority for Int'l Application No. PCT/US2009/040845; Date Mailed: Feb. 3, 2010.
Invitation to Pay Additional Fees and, Where Applicable, Protest Fee (with Partial International Search) for Int'l Application No. PCT/US2009/040846; Date Mailed: Aug. 14, 2009.
Notification of Transmittal of the International Search Report and the Written Opinion of the International Searching Authority for Int'l Application No. PCT/US2009/040846; Date Mailed: Oct. 2, 2009.
Notification of Transmittal of the International Preliminary Report on Patentability for Int'l Application No. PCT/US2009/040846; Date Mailed: Jul. 29, 2010.
Notice of Allowance and Fee(s) Due for U.S. Appl. No. 12/214,535; Date Mailed: Jul. 16, 2010.
Final Office Action for U.S. Appl. No. 12/424,329; Date Mailed: Feb. 28, 2012.
Notice of Grounds for Rejection for Japanese Application No. 2008-521615; Dispatching Date: Feb. 2, 2012.
Final Office Action for U.S. Appl. No. 12/386,266; Date Mailed: Mar. 13, 2012.
Extended European Search Report, Application No. EP 10179769.4 dated Mar. 23, 2011, 8 pp.
Japanese Office Action (Translation) and Search Report from corresponding Japanese Application No. 200980114415.9.
Office Action, U.S. Appl. No. 12/424,329 date of mailing, Jul. 11, 2011.
Office Action, U.S. Appl. No. 12/386,266 date of mailing, Jun. 27, 2011.
Notice of Allowance, U.S. Appl. No. 12/317,487 date of mailing Jun. 11, 2010.
Notice of Allowability, U.S. Appl. No. 12/317,487 date of mailing Sep. 1, 2010.
Notice of Allowance and Fee(s) Due for U.S. Appl. No. 11/485,068; Date Mailed: Jun. 11, 2010.
Office Action for Chinese Application No. 2005800450074; Date Mailed: Apr. 23, 2010 (Including English Translation and Attachments).
Supplemental Notice of Allowability for U.S. Appl. No. 11/485,068; Date Mailed: Aug. 31, 2010.
Communication Pursuant to Article 94(3) EPC for European Application No. 09179762.1; Date Mailed: Sep. 20, 2010.
Final Office Action for U.S. Appl. No. 12/651,024; Date Mailed: Nov. 24, 2010.
Final Office Action for U.S. Appl. No. 12/814,821, dated Oct. 17, 2013.
Office Action for U.S. Appl. No. 13/037,861, "Thermal Sensor Device With Average Temperature and Hot Spot Feedback" date mailed: Apr. 23, 2013.
Non-Final Office Action for U.S. Appl. No. 12/424,329, dated Jan. 13, 2014.

\* cited by examiner

Used Cell Space = $\pi r^2 + 4r^2$
Total Space = $\pi r^2 + 4r^2$
%Utilization = 100.0%

Used Cell Space = $2\pi r^2$
Total Space = $\pi r^2 + 4r^2$
%Utilization = $(2\pi)/(\pi + 4)$
= 88.0%

Used Cell Space = $\pi r^2 + 4r^2$
Total Space = $8r^2$
%Utilization = $(\pi + 4)/8$
= 89.3%

Used Cell Space = $8r^2$
Total Space = $8r^2$
%Utilization = 100.0%

LITHIUM-ION SECONDARY BATTERY

RELATED APPLICATIONS

This application is a continuation of U.S. application Ser. No. 11/821,102, filed on Jun. 21, 2007 now abandoned, which is a continuation of International Application No. PCT/US2005/047383, which designated the United States, was filed on Dec. 23, 2005, and was published in English, which claims the benefit of U.S. Provisional Application No. 60/639,275 filed on Dec. 28, 2004, U.S. Provisional Application No. 60/680,271 filed on May 12, 2005; and U.S. Provisional Application No. 60/699,285 filed on Jul. 14, 2005. The entire teachings of the above-mentioned applications are incorporated herein by reference.

BACKGROUND OF THE INVENTION

Rechargeable batteries, such as lithium-ion rechargeable batteries, are widely used as electrical power for battery-powered portable electronic devices, such as cellular telephones, portable computers, camcorders, digital cameras, PDAs and the like. A typical lithium-ion battery pack for such portable electronic devices employs multiple cells that are configured in parallel and in series. For example, a lithium-ion battery pack may include several blocks connected in series where each block includes one or more cells connected in parallel. Each block typically has an electronic control that monitors voltage levels of the block. In an ideal configuration, each of the cells included in the battery pack is identical. However, when cells are aged and cycled, cells tend to deviate from the initial ideal conditions, resulting in an unbalanced cell pack (e.g., unidentical capacity, impedance, discharge and charge rate). This unbalance among the cells may cause over-charge or over-discharge during normal operation of the rechargeable batteries, and in turn can impose safety concerns, such as explosion (i.e., rapid gas release and possibility for fire).

Traditionally, the conventional lithium-ion rechargeable batteries have employed $LiCoO_2$-type materials as the active component of lithium-ion battery cathodes. For such a lithium-ion cell employing $LiCoO_2$-type active cathode materials to be fully charged, the charge voltage is usually 4.20V. With lower charging voltage, the capacity is lower, which corresponds to lower utilization of active $LiCoO_2$ materials. On the other hand, with higher charging voltage, the cell is less safe. In general, it is a challenge for $LiCoO_2$-based lithium-ion cells to have a high capacity, for example higher than about 3 Ah due to a high safety concern. In order to minimize the safety concern, lowering the charge voltage is one option. However, this will lower the cell capacity, and in turn lower cell energy density. To obtain high capacity, increasing the number of cells in one battery pack may be another option rather than increasing the charge voltage. However, the increase in the number of cells can result in increased probability of unbalance among the cells, which can cause over-charge or over-discharge during normal operation, as discussed above.

The largest mainstream cell that is typically used in the industry currently is a so-called "18650" cell. This cell has an outer diameter of about 18 mm and a length of 65 mm. Typically, the 18650 cell utilizes $LiCoO_2$ and has a capacity between 1800 mAh and 2400 mAh but cells as high as 2600 mAh are currently being used. It is generally believed that it is not safe to use $LiCoO_2$ in a larger cell than the 18650 cell because of a safety concern associated with $LiCoO_2$. Other cells larger than the 18650 cells exist in the art, for example, "26650" cells having an outer diameter of about 26 mm and a length of 65 mm. The 26650 cells typically do not contain $LiCoO_2$ and have worse performance characteristics in terms of Wh/kg and Wh/L than the 18650 cells employing $LiCoO_2$.

Therefore, there is a need to develop new active cathode materials for lithium-ion batteries that minimize or overcome the above-mentioned problems. In particular, there is a need to develop new active cathode materials that can enable manufacturing large batteries, for example, larger than the conventional $LiCoO_2$-based batteries (e.g., 18650 cells) in volume and/or Ah/cell.

SUMMARY OF THE INVENTION

The present invention is generally directed to (1) an active cathode material that includes a mixture of at least one of a lithium cobaltate and a lithium nickelate; and at least one of a manganate spinel and an olivine compound, (2) a lithium-ion battery having such an active cathode material, (3) a method of forming such a lithium-ion battery, (4) a battery pack comprising one or more cells, each of the cells including such an active cathode material, and (5) a system that includes such a battery pack or lithium-ion battery and a portable electronic device.

In one embodiment, the present invention is directed to an active cathode material that includes a mixture of electrode materials. The mixture includes: at least one of a lithium cobaltate and a lithium nickelate; and at least one of a manganate spinel and an olivine compound. The manganate spinel is represented by an empirical formula of $Li_{(1+x1)}(Mn_{1-y1}A'_{y1})_{2-x1}O_{z1}$ where:

x1 is equal to or greater than 0.01 and equal to or less than 0.3;

y1 is greater than 0.0 and equal to or less than 0.3;

z1 is equal to or greater than 3.9 and equal to or less than 4.1; and

A' is at least one member of the group consisting of magnesium, aluminum, cobalt, nickel and chromium.

The olivine compound is represented by an empirical formula of $Li_{(1-x2)}A''_{x2}MPO_4$ where:

x2 is equal to or greater than 0.05 and equal to or less than 0.2, or x2 is equal to or greater than 0.0 and equal to or less than 0.1; and M is at least one member of the group consisting of iron, manganese, cobalt and magnesium; and A" is at least one member of the group consisting of sodium, magnesium, calcium, potassium, nickel and niobium.

In another embodiment, the present invention is directed to an active cathode material that includes a mixture including: a lithium nickelate selected from the group consisting of $LiCoO_2$-coated $LiNi_{0.8}Co_{0.15}Al_{0.05}O_2$, and $Li(Ni_{1/3}Co_{1/3}Mn_{1/3})O_2$; and a manganate spinel represented by an empirical formula of $Li_{(1+x7)}Mn_{2-y7}O_{z7}$ where x7 and y7 are each independently equal to or greater than 0.0 and equal to or less than 1.0; and z7 is equal to or greater than 3.9 and equal to or less than 4.2.

The present invention is also directed to a lithium-ion battery having a cathode that includes an active cathode material as described above. The active cathode material includes a mixture of electrode materials. In one embodiment, the mixture includes: at least one of a lithium cobaltate and a lithium nickelate; and at least one of a manganate spinel and an olivine compound. The manganate spinel and olivine compound are as described above. In another embodiment, the mixture includes a mixture including: a lithium nickelate selected from the group consisting of a lithium cobaltate, $LiCoO_2$-coated $LiNi_{0.8}Co_{0.15}Al_{0.05}O_2$, and $Li(Ni_{1/3}Co_{1/3}Mn_{1/3})O_2$; and a manganate spinel as described above. The battery has a capacity greater than about 3.0 Ah/cell.

Also included in the present invention is a battery pack that includes one or more cells, preferably a plurality of cells. The cell(s) of the battery pack includes an active cathode material as described above. The active cathode material includes a mixture of electrode materials. In one embodiment, the mixture includes: at least one of a lithium cobaltate and a lithium nickelate; and at least one of a manganate spinel and an olivine compound. The manganate spinel and olivine compound are as described above. In another embodiment, the mixture includes a mixture including: a lithium nickelate selected from the group consisting of a lithium cobaltate, $LiCoO_2$-coated $LiNi_{0.8}Co_{0.15}Al_{0.05}O_2$, and $Li(Ni_{1/3}Co_{1/3}Mn_{1/3})O_2$; and a manganate spinel as described above. Preferably the battery pack includes a plurality of cells and at least one cell of the cells has a capacity greater than about 3.0 Ah/cell.

A method of forming a lithium-ion battery having a cathode that includes an active cathode material as described above is also included in the present invention. The method includes forming an active cathode material as described above. The method further includes the steps of forming a cathode electrode with the active cathode material; and forming an anode electrode in electrical contact with the cathode electrode via an electrolyte, thereby forming a lithium-ion battery A system that includes a portable electronic device and a battery pack as described above is also included in the present invention.

The lithium-ion batteries of the invention, which employ a novel blend of two or more different types of active cathode materials in the positive electrode, have safer chemistry characteristics than conventional lithium-ion batteries that solely employ $LiCoO_2$ as the active material of the lithium-ion battery cathodes. In particular, an active cathode material of the invention enables manufacturing of large batteries, e.g., larger than the 18650 cells, for use in these mobile devices partly due to its safety and high capacity in terms of energy density and power density. The present invention also allows for economical manufacturing of larger cells compared to what is common in today's industry (e.g., the 18650 cells), in part due to lower cathode costs and in part due to lower electronics costs. These higher capacity type cells allow lower cost without sacrificing overall safety. These higher capacity type cells can in turn minimize the number of electronic components needed for charge control, which allows lowering of electronic component costs overall for a battery pack utilizing multiple cells connected in series or parallel.

The present invention can be used in mobile electronic devices such as portable computers, cell phones and portable power tools. The present invention can also be used in batteries for hybrid electric vehicles.

DETAILED DESCRIPTION OF THE INVENTION

Figure 1:
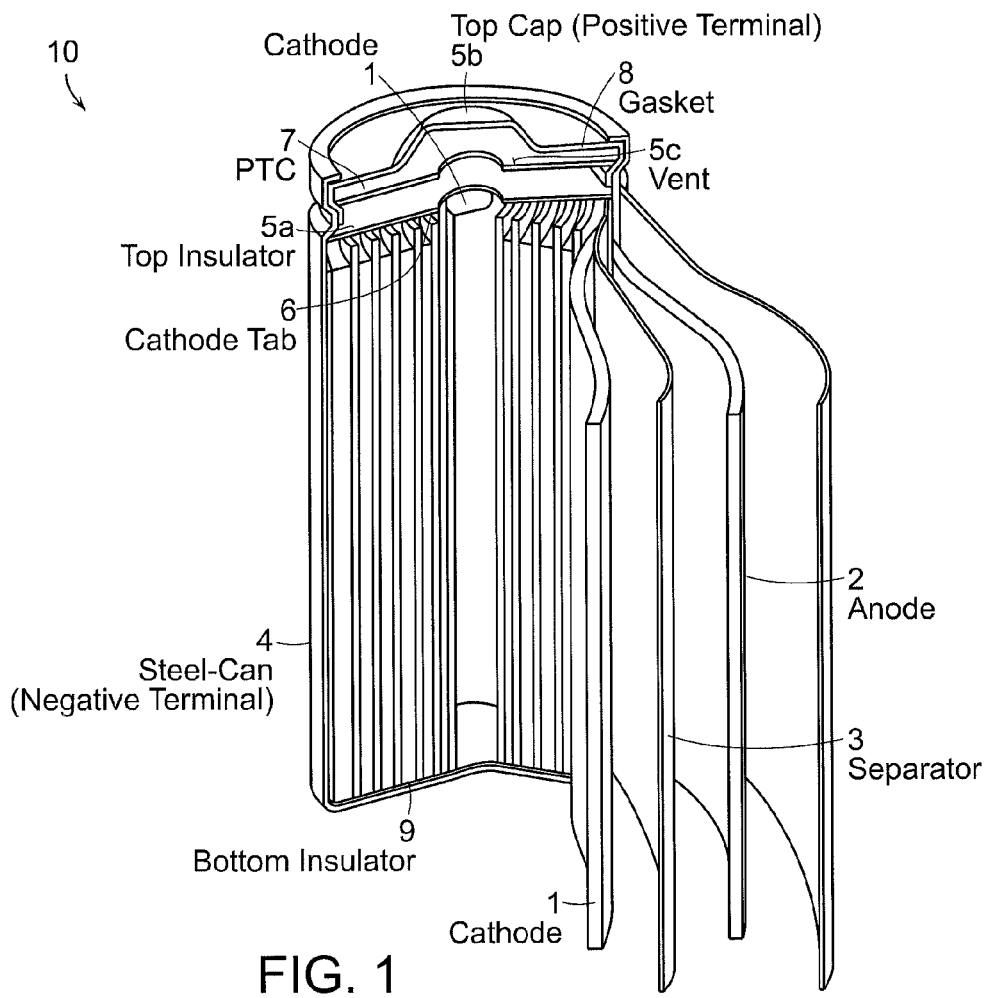
FIG. 1 is a sectional view of a cylindrical-shaped lithium-ion battery typical of that used commercially today and specifically representative of an 18650 type lithium-ion battery.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

In one embodiment, the present invention relates to an active cathode material mixture that can be employed in an electrode of a lithium-ion battery that allows lithium to be reversibly intercalated and extracted. The active cathode material comprises a mixture that includes: at least one of a lithium cobaltate and a lithium nickelate; and at least one of a manganate spinel and an olivine compound.

A lithium nickelate that can be used in the invention includes at least one modifier of either the Li atom or Ni atom, or both. As used herein, a "modifier" means a substituent atom that occupies a site of the Li atom or Ni atom, or both, in a crystal structure of $LiNiO_2$. In one embodiment, the lithium nickelate includes only a modifier of Li atom ("Li modifier"). In another embodiment, the lithium nickelate includes only a modifier of Ni atom ("Ni modifier"). In yet another embodiment, the lithium nickelate includes both of the Li and Ni modifiers. Examples of the Li modifier include barium (Ba), magnesium (Mg), calcium (Ca) and strontium (Sr). Examples of the Ni modifier include those modifiers for Li and in addition aluminum (Al), manganese (Mn) and boron (B). Other examples of the Ni modifier include cobalt (Co) and titanium (Ti). Preferably, the lithium nickelate is coated with $LiCoO_2$. The coating can be a gradient coating or a spot-wise coating.

One particular type of a lithium nickelate that can be used in the invention is represented by an empirical formula of $Li_{x3}Ni_{1-z3}M'_{z3}O_2$ where $0.05<x3<1.2$ and $0<z3<0.5$, and M' is one or more elements selected from a group consisting of Co, Mn, Al, B, Ti, Mg, Ca and Sr. Preferably, M' is one or more elements selected from a group consisting of Mn, Al, B, Ti, Mg, Ca and Sr.

Another particular type of a lithium nickelate that can be used in the invention is represented by an empirical formula of $Li_{x4}A^*_{x5}Ni_{(1-y4-z4)}Co_{y4}Q_{z4}O_a$ where x4 is equal to or greater than about 0.1 and equal to or less than about 1.3; x5 is equal to or greater than 0.0 and equal to or less than about 0.2; y4 is equal to or greater than 0.0 and equal to or less than about 0.2; z4 is equal to or greater than 0.0 and equal to or less than about 0.2; a is greater than about 1.5 and less than about 2.1; A* is at least one member of the group consisting of barium (Ba), magnesium (Mg) and calcium (Ca); and Q is at least one member of the group consisting of aluminum (Al), manganese (Mn) and boron (B). Preferably, y4 is greater than zero. In one preferred embodiment, x5 is equal to zero, and z4 is greater than 0.0 and equal to or less than about 0.2. In another embodiment, z4 is equal to zero, and x5 is greater than 0.0 and equal to or less than about 0.2. In yet another embodiment, x5 and z4 are each independently greater than 0.0 and equal to or less than about 0.2. In yet another embodiment, x5, y4 and z4 are each independently greater than 0.0 and equal to or less than about 0.2. Various examples of lithium nickelates where x5, y4 and z4 are each independently greater than 0.0 and equal to or less than about 0.2 can be found in U.S. Pat. Nos. 6,855,461 and 6,921,609 (the entire teachings of which are incorporated herein by reference).

A specific example of the lithium nickelate is $LiNi_{0.8}Co_{0.15}Al_{0.05}O_2$. A preferred specific example is $LiCoO_2$-coated $LiNi_{0.8}Co_{0.15}Al_{0.05}O_2$. The spot-wise coated cathode has $LiCoO_2$ not fully coated on top of a nickelate core particle, so that the higher reactivity nickelate is deactivated and hence safer. The composition of $LiNi_{0.8}Co_{0.15}Al_{0.05}O_2$ coated with $LiCoO_2$ can naturally deviate slightly in composition from the 0.8:0.15:0.05 ratio between Ni:Co:Al. Deviation may be approximately 10-15% for the Ni, 5-10% for Co and 2-4% for Al.

Another specific example of the lithium nickelate is $Li_{0.97}Mg_{0.03}Ni_{0.9}Co_{0.1}O_2$. A preferred specific example is $LiCoO_2$-coated $Li_{0.97}Mg_{0.03}Ni_{0.9}Co_{0.1}O_2$. The spot-wise coated cathode has $LiCoO_2$ not fully coated on top of a nickelate core particle, so that the higher reactivity nickelate is deactivated and hence safer. The composition of $Li_{0.97}Mg_{0.03}Ni_{0.9}Co_{0.1}O_2$ coated with $LiCoO_2$ can naturally deviate slightly in composition from the 0.03:0.9:0.1 ratio between Mg:Ni:Co. Deviation may be approximately 2-4% for Mg, 10-15% for Ni and 5-10% for Co.

Another preferred nickelate that can be used in the present invention is $Li(Ni_{1/3}Co_{1/3}Mn_{1/3})O_2$, which is also called "333-type nickelate." This 333-type nickelate can be optionally coated with $LiCoO_2$ as described above.

Suitable examples of lithium cobaltates that can be used in the invention include $LiCoO_2$ that is modified by at least one of modifiers of Li and Co atoms. Examples of the Li modifiers are as described above for Li for $LiNiO_2$. Examples of the Co modifiers include the modifiers for Li and aluminum (Al), manganese (Mn) and boron (B). Other examples include nickel (Ni) and titanium (Ti). Particularly, lithium cobaltates represented by an empirical formula of $Li_{x6}M'_{(1-y6)}Co_{(1-z6)}M''_{z6}O_2$, where x6 is greater than 0.05 and less than 1.2; y6 is equal to or greater than 0 and less than 0.1, z6 is equal to or greater than 0 and less than 0.5; M' is at least one member of magnesium (Mg) and sodium (Na) and M'' is at least one member of the group consisting of manganese (Mn), aluminum (Al), boron (B), titanium (Ti), magnesium (Mg), calcium (Ca) and strontium (Sr), can be used in the invention.

Another example of lithium cobaltates that can be used in the invention includes $LiCoO_2$.

It is particularly preferred that the compounds have a spherical-like morphology as this improves packing and production characteristics.

Preferably, a crystal structure of each of the lithium cobaltate and lithium nickelate is independently a R-3m type space group (rhombohedral, including distorted rhombohedral). Alternatively, a crystal structure of the lithium nickelate can be in a monoclinic space group (e.g., P2/m or C2/m). In a R-3m type space group, the lithium ion occupies the "3a" site (x=0, y=0 and z=0) and the transition metal ion (i.e., Ni in a lithium nickelate and Co in a lithium cobaltate) occupies the "3b" site (x=0, y=0, z=0.5). Oxygen is located in the "6a" site (x=0, y=0, z=z0, where z0 varies depending upon the nature of the metal ions, including modifier(s) thereof).

Olivine compounds that can be used in the invention are generally represented by a general formula $Li_{1-x2}A''_{x2}MPO_4$, where x2 is equal to or greater than 0.05, or x2 is equal to or greater than 0.0 and equal to or greater than 0.1; M is one or more elements selected from a group consisting of Fe, Mn, Co, or Mg; and A'' is selected from a group consisting of Na, Mg, Ca, K, Ni, Nb. Preferably, M is Fe or Mn. More preferably, $LiFePO_4$ or $LiMnPO_4$, or both are used in the invention. In a preferred embodiment, the olivine compounds are coated with a material having high electrical conductivity, such as carbon. In a more preferred embodiment, carbon-coated $LiFePO_4$ or carbon-coated $LiMnPO_4$ is used in the invention. Various examples of olivine compounds where M is Fe or Mn can be found in U.S. Pat. No. 5,910,382 (the entire teachings of which are incorporated herein by reference).

The olivine compounds have typically a small change in crystal structure upon charging/discharging, which makes the olivine compounds superior in terms of cycle characteristic. Also, safety is generally high even when a battery is exposed to a high temperature environment. Another advantage of the olivine compounds (e.g., $LiFePO_4$ and $LiMnPO_4$) is their relatively low cost.

Manganate spinel compounds have a manganese base, such as $LiMn_2O_4$. While the manganate spinel compounds typically have low specific capacity (e.g., in a range of about 120 to 130 mAh/g), they have high power delivery when formulated into electrodes and are typically safe in terms of chemical reactivity at higher temperatures. Another advantage of the manganate spinel compounds is their relatively low cost.

One type of manganate spinel compounds that can be used in the invention is represented by an empirical formula of $Li_{1+x1}(Mn_{1-y1}A'_{y1})_{2-x1}O_{z1}$, where A' is one or more of Mg, Al, Co, Ni and Cr; x1 is equal to or greater than 0.01 and equal to or less than 0.3; y1 is greater than 0.0 and equal to or less than 0.3; z1 is equal to or greater than 3.9 and equal to or less than 4.1. Preferably, A' includes a $M^{3+}$ ion, such as $Al^{3+}$, $Co^{3+}$, $Ni^{3+}$ and $Cr^{3+}$, more preferably $Al^{3+}$. One specific example includes $LiMn_{1.9}Al_{0.1}O_4$. The manganate spinel compounds of $Li_{1+x1}(Mn_{1-y1}A'_{y1})_{2-x1}O_{z1}$ can have enhanced cyclability and power compared to those of $LiMn_2O_4$. Examples of this type of manganate spinel include $Li_{1+x}Mn_{2-x}O_4$, and its variations with Al and Mg modifiers. Various examples of manganate spinel compounds of the type $Li_{1+x1}(Mn_{1-y1}A'_{y1})_{2-x1}O_{z1}$ can be found in U.S. Pat. Nos. 4,366,215, 5,196,270, 5,316,877 (the entire teachings of which are incorporated herein by reference).

The active cathode materials of the invention can be prepared by mixing two or more active cathode components described above (i.e., a lithium cobaltate, a lithium nickelate, a manganate spinel and an olivine compound), preferably in a powdered form. Generally, the olivine compounds, such as LiFePO$_4$, manganate spinel compounds, such as Li$_{1+x1}$(Mn$_{1-y1}$A'$_{y1}$)$_{2-x1}$O$_{z1}$, and lithium nickelates, such as Li(Ni$_{1/3}$Co$_{1/3}$Mn$_{1/3}$)O$_2$, have high safety. Generally, lithium cobaltates, such as LiCoO$_2$ and lithium nickelates, such as Li(Ni$_{1/3}$Co$_{1/3}$Mn$_{1/3}$)O$_2$ and Li$_{x4}$Ni$_{1-y4-z4}$Co$_{y4}$Q$_{z4}$O$_a$-type compounds have a high-energy density. General properties of some cathode components for the cathode materials of the invention are summarized in Table 1.

TABLE 1

Typical Attributes of Active Cathode Materials of the Invention

| Cathode Material | Density (g/cc) | C/20 Capacity (mAh/g) | 1C Capacity (mAh/g) | 1$^{st}$ Cycle Efficiency (%) |
|---|---|---|---|---|
| lithium cobaltate | 5.05 | 150 | 145 | 96 |
| lithium nickelate | 4.80 | 210 | 180 | 92 |
| olivine (M = Fe) | 3.30 | 155 | 140 | 95 |
| manganate spinel | 4.20 | 120 | 115 | 94 |

Characteristics of the cathode materials of the invention relate to capacity, cyclability, and safety. For example, the cathode materials of the invention can exhibit different capacities depending on the charge/discharge rate and other external conditions, such as electrolyte choice and electrode formulation. "Capacity" is defined herein as the number of Li ions that can reversibly be removed from the crystal structures of lithium-based materials, such as those of the invention. "Reversibility," as defined herein, means that the structure substantially maintains its integrity and that Li can be intercalated back to restore the initial crystal structure. In theory, this is the definition of capacity at an infinitely small rate. "Safety," as defined herein, means structural stability or structural integrity; if a material decomposes during cycling or is easily decomposed or causes gassing at elevated temperatures, the material is considered unsafe, particularly if the decomposition or gassing leads to initiation of thermal runaway behavior inside the cell or produces high internal pressure. Polarization behavior adds yet another dimension to capacity and the effects of polarization behavior to performance of a lithium-ion battery are determined by the interaction between the lithium-ion cell and the control electronics of the battery pack or application device using the lithium-ion cell.

Formulation of an electrode suitable for high energy and power, and sufficient safety, can be achieved by a specific ratio of components (i.e., a lithium cobaltate, a lithium nickelate, a manganate spinel and an olivine compound) of the active cathode materials of the invention.

In one embodiment, an active cathode material of the invention includes a lithium nickelate that includes at least one modifier of either the Li atom or Ni atom, or both. Preferably, the lithium nickelate is represented by an empirical formula of Li$_{x3}$Ni$_{(1-z3)}$M'$_{z3}$O$_2$ described above. Alternatively, the lithium nickelate is represented by an empirical formula of Li$_{x4}$A*$_{x5}$Ni$_{(1-y4-z4)}$Co$_{y4}$Q$_{z4}$O$_a$ described above. In a specific example, the lithium nickelate is represented by an empirical formula of Li$_{x4}$A*$_{x5}$Ni$_{(1-y4-z4)}$Co$_{y4}$Q$_{z4}$O$_a$ where x5, y4 and z4 are each independently greater than 0.0 and equal to or less than about 0.2. Specific examples of the lithium nickelate are as described above.

In a second embodiment, an active cathode material of the invention includes a lithium cobaltate represented by an empirical formula of Li$_{x6}$Co$_{(1-z6)}$M"$_{z6}$O$_2$ described above. Specific examples of the lithium cobaltate are as described above.

In a third embodiment, an active cathode material of the invention includes an olivine compound represented by an empirical formula of Li$_{(1-x2)}$A"$_{x2}$MPO$_4$ described above. Specific examples of the olivine compound are as described above. In a preferred embodiment, M is iron or magnesium. In a preferred embodiment, the olivine compound is coated with carbon.

In a fourth embodiment, an active cathode material of the invention includes a lithium cobaltate, such as LiCoO$_2$, and a manganate spinel. The lithium cobaltate and manganate spinel, including specific examples thereof, are as described above. Preferably, the lithium cobaltate, and manganate spinel are in a ratio of lithium cobaltate:manganate spinel between about 0.8:0.2 to about 0.4:0.6. In one example of the fourth embodiment, the manganate spinel is represented by Li$_{1+x1}$(Mn$_{1-y1}$A'$_{y1}$)$_{2-x1}$O$_{z1}$. In another example of the fourth embodiment, the manganate spinel is represented by Li$_{1+x7}$Mn$_{2-x7}$O$_4$, preferably LiMn$_2$O$_4$.

In a fifth embodiment, an active cathode material of the invention includes a lithium nickelate and a manganate spinel represented by Li$_{1+x1}$(Mn$_{1-y1}$A'$_{y1}$)$_{2-x1}$O$_{z1}$ described above. The lithium nickelate and manganate spinel, including specific examples thereof, are as described above. Preferably, the lithium nickelate and manganate spinel are in a ratio of lithium nickelate:manganate spinel between about 0.9:0.1 to about 0.3:0.7. In one example of the fifth embodiment, the lithium nickelate is Li(Ni$_{1/3}$Co$_{1/3}$Mn$_{1/3}$)O$_2$, LiNi$_{0.8}$Co$_{0.15}$Al$_{0.05}$O$_2$ or Li$_{0.97}$Mg$_{0.03}$Ni$_{0.9}$Co$_{0.1}$O$_2$. Preferably, the lithium nickelate is LiCoO$_2$-coated, LiNi$_{0.8}$Co$_{0.15}$Al$_{0.05}$O$_2$ or Li$_{0.97}$Mg$_{0.03}$Ni$_{0.9}$Co$_{0.1}$O$_2$. When LiCoO$_2$-coated, LiNi$_{0.8}$Co$_{0.15}$Al$_{0.05}$O$_2$ or Li$_{0.97}$Mg$_{0.03}$Ni$_{0.9}$Co$_{0.1}$O$_2$ is used, the lithium nickelate and manganate spinel are preferably in a ratio of lithium nickelate-to-manganate spinel between about 0.9:0.1 to about 0.3:0.7. When Li(Ni$_{1/3}$Co$_{1/3}$Mn$_{1/3}$)O$_2$ is used, the lithium nickelate and manganate spinel are preferably in a ratio of lithium nickelate:manganate spinel between about 0.7:0.3 to about 0.3:0.7.

In a sixth embodiment, an active cathode material of the invention includes at least one lithium nickelate selected from the group consisting of Li(Ni$_{1/3}$Co$_{1/3}$Mn$_{1/3}$)O$_2$ and LiCoO$_2$-coated LiNi$_{0.8}$Co$_{0.15}$Al$_{0.05}$O$_2$; and a manganate spinel represented by Li$_{1+x7}$Mn$_{2-y7}$O$_{z7}$, preferably LiMn$_2$O$_4$. Preferably, the lithium nickelate and manganate spinel are in a ratio of lithium nickelate:manganate spinel between about 0.9:0.1 to about 0.3:0.7. When Li(Ni$_{1/3}$Co$_{1/3}$Mn$_{1/3}$)O$_2$ is used, the lithium nickelate and manganate spinel are in a ratio of lithium nickelate:manganate spinel between about 0.9:0.1 to about 0.5:0.5.

In a seventh embodiment, the active cathode material of the invention includes a lithium cobaltate, such as LiCoO$_2$, a manganate spinel and a lithium nickelate. The lithium cobaltate, manganate spinel and lithium nickelate, including specific examples thereof, are as described above. Preferably, the lithium cobaltate, manganate spinel and lithium nickelate are in a ratio of lithium cobaltate:manganate spinel:lithium nickelate between about 0.05 and about 0.8:between about 0.05 and about 0.7 (e.g., between about 0.05 and about 0.3, or between about 0.3 and about 0.7):between about 0.05 and about 0.9 (e.g., between about 0.4 and about 0.9, or between about 0.05 and about 0.8). In one example, the lithium nickelate is represented by Li$_{x4}$A*$_{x5}$Ni$_{(1-y4-z4)}$Co$_{y4}$Q$_{z4}$O$_a$. In a second example, the lithium nickelate is represented by Li$_{x3}$Ni$_{(1-z3)}$M'$_{z3}$O$_2$, more preferably LiNi$_{0.8}$Co$_{0.15}$Al$_{0.05}$O$_2$ that is gradient- or spot-wise coated with LiCoO$_2$. In a third example, the lithium nickelate is Li(Ni$_{1/3}$Co$_{1/3}$Mn$_{1/3}$)O$_2$. In a fourth example, the lithium nickelate includes at least one modifier of both the Li and Ni atoms, such as $Li_{x4}A^*_{x5}Ni_{(1-y4-z4)}Co_{y4}Q_{z4}O_a$ where x5, y4 and z4 are each independently greater than 0.0 and equal to or less than about 0.2, and the manganate spinel is represented by $Li_{1+x1}(Mn_{1-y1}A'_{y1})_{2-x1}O_{z1}$. Preferably, when $Li_{x4}A^*_{x5}Ni_{(1-y4-z4)}Co_{y4}Q_{z4}O_a$ and $Li_{1+x1}(Mn_{1-y1}A'_{y1})_{2-x1}O_{z1}$ are used, the lithium cobaltate, manganate spinel and lithium nickelate are in a ratio of lithium cobaltate:manganate spinel:lithium nickelate between about 0.05 and about 0.30:between about 0.05 and about 0.30:between about 0.4 and about 0.9. In a fifth example, the lithium nickelate is $Li(Ni_{1/3}Co_{1/3}Mn_{1/3})O_2$ or optionally $LiCoO_2$-coated $LiNi_{0.8}Co_{0.15}Al_{0.05}O_2$, and the manganate spinel is represented by $Li_{1+x1}(Mn_{1-y1}A'_{y1})_{2-x1}O_{z1}$. In this fifth example, when $Li(Ni_{1/3}Co_{1/3}Mn_{1/3})O_2$ is used, $Li(Ni_{1/3}Co_{1/3}Mn_{1/3})O_2$, $Li_{1+x1}(Mn_{1-y1}A'_{y1})_{2-x1}O_{z1}$ and lithium cobaltate are in a ratio of $Li(Ni_{1/3}Co_{1/3}Mn_{1/3})O_2:Li_{1+x1}(Mn_{1-y1}A'_{y1})_{2-x1}O_{z1}$:lithium cobaltate between about 0.05 and about—0.8; between about 0.3 and about—0.7:between about 0.05 and—about 0.8.

In an eighth embodiment, an active cathode material of the invention includes two or more lithium nickelates and a manganate spinel. The lithium nickelates and manganate spinel, including specific examples thereof, are as described above. Preferably, lithium nickelates and manganate spinel are in a ratio of lithium nickelates:manganate spinel between about 0.05 and about 0.8:between about 0.05 and about 0.9. Preferably, the manganate spinel is represented by $Li_{1+x1}(Mn_{1-y1}A'_{y1})_{2-x1}O_{z1}$. In one example, the lithium nickelates include a lithium nickelate represented by $Li_{x4}A^*_{x5}Ni_{(1-y4-z4)}Co_{y4}Q_{z4}O_a$. In another example, the lithium nickelates includes a lithium nickelate represented by $Li_{x3}Ni_{(1-z3)}M'_{z3}O_2$. Alternatively, the lithium nickelates includes a lithium nickelate including at least one modifier of both the Li and Ni atoms, such as $Li_{x4}A^*_{x5}Ni_{(1-y4-z4)}Co_{y4}Q_{z4}O_a$ where x5, y4 and z4 are each independently greater than 0.0 and equal to or less than about 0.2. In a specific example, the lithium nickelates include $Li(Ni_{1/3}Co_{1/3}Mn_{1/3})O_2$ and a lithium nickelate represented by $Li_{x4}A^*_{x5}Ni_{(1-y4-z4)}Co_{y4}Q_{z4}O_a$. In another specific example, the lithium nickelates include $Li(Ni_{1/3}Co_{1/3}Mn_{1/3})O_2$; and a lithium nickelate that includes at least one modifier of both the Li and Ni atoms, such as $Li_{x4}A^*_{x5}Ni_{(1-y4-z4)}Co_{y4}Q_{z4}O_a$ where x5, y4 and z4 are each independently greater than 0.0 and equal to or less than about 0.2. In yet another specific example, the lithium nickelates include $Li(Ni_{1/3}Co_{1/3}Mn_{1/3})O_2$ and a lithium nickelate represented by $Li_{x4}A^*_{x5}Ni_{(1-y4-z4)}Co_{y4}Q_{z4}O_a$, and the manganate spinel is represented by $Li_{1+x1}(Mn_{1-y1}A'_{y1})_{2-x1}O_{z1}$. In this specific example, the lithium nickelates and manganate spinel are in a ratio of $Li(Ni_{1/3}Co_{1/3}Mn_{1/3})O_2:Li_{x4}A^*_{x5}Ni_{(1-y4-z4)}Co_{y4}Q_{z4}O_a:Li_{1+x1}(Mn_{1-y1}A'_{y1})_{2-x1}O_{z1}$ between about 0.05 and about 0.8:between about 0.05 and about 0.7:between about 0.05 and about 0.9.

In a ninth embodiment, an active cathode material of the invention includes a lithium cobaltate, such as $LiCoO_2$, and an olivine compound represented by $Li_{(1-x2)}A''_{x2}MPO_4$ described above, preferably coated with carbon. The lithium cobaltate and olivine compound, including specific examples thereof, are as described above. Preferably, the lithium cobaltate and olivine compound are in a ratio of lithium cobaltate:olivine compound between about 0.9:0.1 to about 0.3:0.7. In one example, the olivine compound is represented by $Li_{(1-x2)}A''_{x2}MPO_4$ where M is iron or manganese, such as $LiFePO_4$ and $LiMnPO_4$. In this example, preferably, the lithium cobaltate and olivine compound are in a ratio of lithium cobaltate:olivine compound between about 0.8:0.2 to about 0.4:0.6.

In a tenth embodiment, an active cathode material of the invention includes a lithium nickelate, and an olivine compound represented by $Li_{(1-x2)}A''_{x2}MPO_4$ described above, preferably coated with carbon. The lithium nickelate and olivine compound, including specific examples thereof, are as described above. Preferably, the lithium nickelate and olivine compound are in a ration of lithium nickelate:olivine compound between about 0.9:0.1 to about 0.3:0.7. In one example, the olivine compound is represented by $Li_{(1-x2)}A''_{x2}MPO_4$ where M is iron or manganese, such as $LiFePO_4$ and $LiMnPO_4$. In a second example, the lithium nickelates include a lithium nickelate represented by $Li_{x4}A^*_{x5}Ni_{(1-y4-z4)}Co_{y4}Q_{z4}O_a$. In a third example, the lithium nickelates includes a lithium nickelate represented by $Li_{x3}Ni_{(1-z3)}M'_{z3}O_2$. Alternatively, the lithium nickelates includes a lithium nickelate including at least one modifier of both the Li and Ni atoms, such as $Li_{x4}A^*_{x5}Ni_{(1-y4-z4)}Co_{y4}Q_{z4}O_a$ where x5, y4 and z4 are each independently greater than 0.0 and equal to or less than about 0.2. In a specific example, the lithium nickelate is $Li(Ni_{1/3}Co_{1/3}Mn_{1/3})O_2$ and the olivine compound is represented by $Li_{(1-x2)}A''_{x2}MPO_4$ where M is iron or manganese. Preferably, in the second example, the lithium nickelate and olivine compound are in a ratio of lithium nickelate:olivine compound between about 0.9:0.1 to about 0.5:0.5. In a second specific example, the lithium nickelate is represented by $Li_{x4}A^*_{x5}Ni_{(1-y4-z4)}Co_{y4}Q_{z4}O_a$, preferably $Li_{x4}A^*_{x5}Ni_{(1-y4-z4)}Co_{y4}Q_{z4}O_a$ where x5, y4 and z4 are each independently greater than 0.0 and equal to or less than about 0.2, and the olivine compound is represented by $Li_{(1-x2)}A''_{x2}MPO_4$ where M is iron or manganese. In a third specific example, the lithium nickelate is $LiNi_{0.8}Co_{0.15}Al_{0.05}O_2$, preferably $LiCoO_2$-coated $LiNi_{0.8}Co_{0.15}Al_{0.05}O_2$, and the olivine compound is represented by $Li_{(1-x2)}A''_{x2}MPO_4$ where M is iron or manganese. Preferably, in the third specific example, the lithium nickelate and olivine compound are in a ratio of lithium nickelate:olivine compound between about 0.9:0.1 to about 0.3:0.7.

In an eleventh embodiment, an active cathode material of the invention includes two or more lithium nickelates, and an olivine compound, preferably an olivine compound represented by $Li_{(1-x2)}A''_{x2}MPO_4$ where M is iron or manganese. The lithium nickelates and olivine compound, including specific examples thereof, are as described above. Preferably, the olivine compound is coated with carbon. In this embodiment, the lithium nickelates and olivine compound are in a ratio of lithium nickelates:olivine compound between about 0.05 and about 0.9:between about 0.05 and 0.9. In one example, the lithium nickelates include a lithium nickelate represented by $Li_{x4}A^*_{x5}Ni_{(1-y4-z4)}Co_{y4}Q_{z4}O_a$. In another example, the lithium nickelates includes a lithium nickelate represented by $Li_{x3}Ni_{(1-z3)}M'_{z3}O_2$. Alternatively, the lithium nickelates includes a lithium nickelate including at least one modifier of both the Li and Ni atoms, such as $Li_{x4}A^*_{x5}Ni_{(1-y4-z4)}Co_{y4}Q_{z4}O_a$ where x5, y4 and z4 are each independently greater than 0.0 and equal to or less than about 0.2. In a specific example, the lithium nickelate is represented by an empirical formula of $Li_{x4}A^*_{x5}Ni_{(1-y4-z4)}Co_{y4}Q_{z4}O_a$ a where x5, y4 and z4 are each independently greater than 0.0 and equal to or less than about 0.2. In one specific example, the olivine compound is represented by $Li_{(1-x2)}A''_{x2}MPO_4$ where M is iron or manganese, such as $LiFePO_4$ and $LiMnPO_4$, and the lithium nickelates include $Li(Ni_{1/3}Co_{1/3}Mn_{1/3})O_2$ and a lithium nickelate including at least one modifier of both the Li and Ni atoms, such as $Li_{x4}A^*_{x5}Ni_{(1-y4-z4)}Co_{y4}Q_{z4}O_a$ where x5, y4 and z4 are each independently greater than 0.0 and equal to or less than about 0.2. In this example, the lithium nickelates and olivine compound are preferably in a ratio of $Li(Ni_{1/3}Co_{1/3}Mn_{1/3})O_2$:lithium nickelate:olivine compound between about 0.05 and about 0.8:between about 0.05 and about 0.7:between about 0.05 and about 0.9.

In a twelfth embodiment, an active cathode material of the invention includes a lithium nickelate, a lithium cobaltate, such as $LiCoO_2$, and an olivine compound represented by $Li_{(1-x2)}A''_{x2}MPO_4$ described above. The lithium nickelate, lithium cobaltate and olivine compound, including specific examples thereof, are as described above. In this embodiment, the lithium nickelate, lithium cobaltate and olivine compound are preferably in a ratio of lithium cobaltate:olivine compound:lithium nickelate between about 0.05 and about 0.8:between about 0.05 and about 0.7:between about 0.05 and about 0.9. In one example, the lithium nickelates include a lithium nickelate represented by $Li_{x4}A^*_{x5}Ni_{(1-y4-z4)}Co_{y4}Q_{z4}O_a$. In another example, the lithium nickelates includes a lithium nickelate represented by $Li_{x3}Ni_{(1-z3)}M'_{z3}O_2$. Alternatively, the lithium nickelates includes a lithium nickelate including at least one modifier of both the Li and Ni atoms, such as $Li_{x4}A^*_{x5}Ni_{(1-y4-z4)}Co_{y4}Q_{z4}O_a$ where x5, y4 and z4 are each independently greater than 0.0 and equal to or less than about 0.2. In one specific example, the lithium nickelate is represented by $Li_{x4}A^*_{x5}Ni_{(1-y4-z4)}Co_{y4}Q_{z4}O_a$ preferably $Li_{x4}A^*_{x5}Ni_{(1-y4-z4)}Co_{y4}Q_{z4}O_a$ where x5, y4 and z4 are each independently greater than 0.0 and equal to or less than about 0.2, and the olivine compound is represented by $Li_{(1-x2)}A''_{x2}MPO_4$ where M is iron or manganese. In this specific example, the lithium nickelate, lithium cobaltate and olivine compound are preferably in a ratio of lithium cobaltate:olivine compound: lithium nickelate between about 0.05 and about 0.30:between about 0.05 and about 0.30:between about 0.4 and about 0.9. In a second specific example, the lithium nickelate is $Li(Ni_{1/3}Co_{1/3}Mn_{1/3})O_2$, and the olivine compound is represented by $Li_{(1-x2)}A''_{x2}MPO_4$ where M is iron or manganese. In the second specific example, preferably the lithium nickelate, lithium cobaltate and olivine compound are in a ratio of lithium nickelate:olivine:lithium cobaltate between about 0.05-0.8:about 0.3-0.7:about 0.05-0.8. In a third specific example, the lithium nickelate is $LiNi_{0.8}Co_{0.15}Al_{0.05}O_2$, preferably $LiCoO_2$-coated $LiNi_{0.8}Co_{0.15}Al_{0.05}O_2$, and the olivine compound is represented by $Li_{(1-x2)}A''_{x2}MPO_4$ where M is iron or manganese.

In a thirteenth embodiment, an active cathode material of the invention includes a manganate spinel, an olivine compound, preferably an olivine compound represented by $Li_{(1-x2)}A''_{x2}MPO_4$ where M is iron or manganese, and a lithium nickelate. The manganate spinel, olivine compound and lithium nickelate, including specific examples thereof, are as described above. In this embodiment, manganate spinel, olivine compound and lithium nickelate are preferably in a ratio of manganate spinel:olivine: lithium nickelate between about 0.05-0.9:about 0.05-0.9:about 0.05-0.9. In one example, the manganate spinel is represented by $Li_{(1+x1)}(Mn_{1-y1}A'_{y1})_{2-x1}O_{z1}$. In another example, the manganate spinel is represented by $Li_{1+x7}Mn_{2-x7}O_4$, preferably $LiMn_2O_4$. In one specific example, the manganate spinel is represented by $Li_{(1+x1)}(Mn_{1-y1}A'_{y1})_{2-x1}O_{z1}$ and the lithium nickelate includes at least one modifier of both the Li and Ni atoms, such as a lithium nickelate represented by $Li_{x4}A^*_{x5}Ni_{(1-y4-z4)}Co_{y4}Q_{z4}O_a$ where x5, y4 and z4 are each independently greater than 0.0 and equal to or less than about 0.2. In a second specific example, the manganate spinel is represented by $Li_{(1+x1)}(Mn_{1-y1}A'_{y1})_{2-x1}O_{z1}$ and the lithium nickelate is represented by $Li_{x3}Ni_{(1-z3)}M'_{z3}O_2$, preferably $LiNi_{0.8}Co_{0.15}Al_{0.05}O_2$, more preferably $LiCoO_2$-coated $LiNi_{0.8}Co_{0.15}Al_{0.05}O_2$. In a third specific example, the manganate spinel is represented by $Li_{(1+x1)}(Mn_{1-y1}A'_{y1})_{2-x1}O_{z1}$ and the lithium nickelate is $Li(Ni_{1/3}Co_{1/3}Mn_{1/3})O_2$. In a fourth specific example, the managanate is represented by $Li_{1-x7}Mn_{2-x7}O_4$, preferably $Li_{1+x}Mn_{2-x}O_4$ and its variations modified with Al and Mg, and the lithium nickelate is selected from the group consisting of $Li(Ni_{1/3}Co_{1/3}Mn_{1/3})O_2$, and $LiCoO_2$-coated $LiNi_{0.8}Co_{0.15}Al_{0.05}O_2$.

In a fourteenth embodiment, an active cathode material of the invention includes two or more lithium nickelates as described above. In one example, the active cathode material includes $Li(Ni_{1/3}Co_{1/3}Mn_{1/3})O_2$. In a specific example, the active cathode material includes $Li(Ni_{1/3}Co_{1/3}Mn_{1/3})O_2$ and a lithium nickelate including at least one modifier of both the Li and Ni atoms, such as a lithium nickelate represented by $Li_{x4}A^*_{x5}Ni_{(1-y4-z4)}Co_{y4}Q_{z4}O_a$ where x5, y4 and z4 are each independently greater than 0.0 and equal to or less than about 0.2. Preferably, in this example, the lithium nickelates are in a ratio of $Li(Ni_{1/3}Co_{1/3}Mn_{1/3})O_2:Li_{x4}A^*_{x5}Ni_{(1-y4-z4)}Co_{y4}Q_{z4}O_a$ between about 0.7:0.3 to about 0.3:0.7. In another specific example, the active cathode material includes $Li(Ni_{1/3}Co_{1/3}Mn_{1/3})O_2$ and $LiNi_{0.8}Co_{0.15}Al_{0.05}O_2$, more preferably $LiCoO_2$-coated $LiNi_{0.8}Co_{0.15}Al_{0.05}O_2$. Preferably, in this example, the lithium nickelates are in a ratio of $Li(Ni_{1/3}Co_{1/3}Mn_{1/3})O_2:LiNi_{0.8}Co_{0.15}Al_{0.05}O_2$ between about 0.8:0.2 to about 0.2:0.8.

Another aspect of the present invention is directed to a lithium-ion battery that employs the active cathode materials of the invention described above. Preferably, the battery has a greater than about 2.2 Ah/cell capacity. More preferably, the battery has a greater than about 3.0 Ah/cell capacity, such as equal to or greater than about 3.3 Ah/cell; equal to or greater than about 3.5 Ah/cell; equal to or greater than about 3.8 Ah/cell; equal to or greater than about 4.0 Ah/cell; equal to or greater than about 4.2 Ah/cell; between about 3.0 Ah/cell and about 6 Ah/cell; between about 3.3 Ah/cell and about 6 Ah/cell; between about 3.3 Ah/cell and about 5 Ah/cell; between about 3.5 Ah/cell and about 5 Ah/cell; between about 3.8 Ah/cell and about 5 Ah/cell; and between about 4.0 Ah/cell and about 5 Ah/cell.

In one embodiment, the batteries of the invention include an active cathode material including a mixture that includes: at least one of a lithium cobaltate and a lithium nickelate; and at least one of a manganate spinel represented by an empirical formula of $Li_{(1+x1)}(Mn_{1-y1}A'_{y1})_{2-x1}O_{z1}$ described above and an olivine compound represented by an empirical formula of $Li_{(1-x2)}A''_{x2}MPO_4$ described above. In another embodiment, the batteries of the invention include an active cathode material including a mixture that includes: at least one of a lithium cobaltate and a lithium nickelate selected from the group consisting of $LiCoO_2$-coated $LiNi_{0.8}Co_{0.15}Al_{0.05}O_2$, and $Li(Ni_{1/3}Co_{1/3}Mn_{1/3})O_2$; and a manganate spinel having an empirical formula of $Li_{(1+x7)}Mn_{2-y7}O_{z7}$ described above. In yet another embodiment, the batteries of the invention include an active cathode material including a mixture that includes: a lithium nickelate selected from the group consisting of $LiCoO_2$-coated $LiNi_{0.8}Co_{0.15}Al_{0.05}O_2$, and $Li(Ni_{1/3}Co_{1/3}Mn_{1/3})O_2$; and a manganate spinel having an empirical formula of $Li_{(1+x7)}Mn_{2-y7}O_{z7}$ described above. The batteries each independently have a capacity as described above, preferably greater than about 3.0 Ah/cell.

In a preferred embodiment, cell building for the batteries of the invention utilize a larger format in terms of Ah/cell than is currently used in the industry such as in the case for 18650 cells.

FIG. 1 shows a cylindrical shape lithium-ion battery (10), which includes a positive electrode (1), coated onto an aluminum foil, a negative electrode (2), coated onto a copper foil, a separator positioned between the positive and negative electrodes (3), a can containing the wound components (4), an electrically insulated (5a) (from can) top that is crimped onto the can (5b) (top may contain a current-interrupt-device CID, and a vent (5c)), nickel lead that is electrically connecting the anode with the top, and an aluminum lead that is electrically connecting the cathode with the can (6). A PTC switch (7) can be located inside or outside the can. Insulators are also located at the top (8) and the bottom (9) of the can that keep foils from touching each other and insulates foil ends from can.

The negative active material (anode) can include any material allowing lithium to be inserted in or removed from the material. Examples of such materials include carbonaceous materials, for example, non-graphitic carbon, artificial carbon, natural graphite, pyrolytic carbons, cokes such as pitch coke, needle coke, petroleum coke, graphite, vitreous carbons, or a heat treated organic polymer compound obtained by carbonizing phenol resins, furan resins, or similar, carbon fibers, and activated carbon. Further, metallic lithium, lithium alloys, and an alloy or compound thereof are usable as the negative active materials. In particular, the metal element or semiconductor element allowed to form an alloy or compound with lithium may be a group IV metal element or semiconductor element, such as but not limited to, silicon or tin. In particular amorphous tin, that is doped with a transition metal, such as cobalt or iron/nickel, is a metal that has high promise for anode material in these type batteries. Oxides allowing lithium to be inserted in or removed from the oxide at a relatively low potential, such as iron oxide, ruthenium oxide, molybdenum oxide, tungsten oxide, titanium oxide, and tin oxide, and nitrides can be similarly usable as the negative active materials.

The positive electrode of the batteries or cells of the invention include the active cathode materials of the invention described above. In particular, the batteries of the invention employ the active cathode materials including two or more advantages of: high specific capacity of the lithium nickelates (e.g., $Li(Ni_{1/3}Co_{1/3}Mn_{1/3})O_2$ or $LiNi_{0.8}Co_{0.15}Al_{0.05}O_2$) or lithium cobaltates (e.g., $LiCoO_2$); relatively high safety of the olivine compounds (e.g., $LiFePO_4$) or manganate spinels (e.g., $LiMn_2O_4$). When the active cathode materials of the invention are used in a positive electrode structure for use in the lithium batteries of the invention, the resulting batteries are sufficiently safe and have high capacity in terms of Wh/kg and/or Wh/L. The cells of the invention typically have a form factor that is larger, both in terms of absolute volume and Ah/cell, compared to currently available 18650 cells (i.e., 183665 form factor). The increased cell size and capacity are made possible at least partly by the relatively higher safety of the mixed cathode. The cells of the invention for lithium batteries can have safer properties than corresponding cells utilizing solely $LiCoO_2$ as the cathode material, although the cells have similar or higher capacities.

Since each one of the cathode components in the mixture has unique chemistry it is particularly important to have an electrolyte that has additives suitable for SEI formation of each chemical. For instance, a suitable electrolyte for batteries having cathodes containing manganate spinel and lithium cobaltate and anodes containing graphite may contain additives of LiBOB, PS, and VC, which are suitable for these types of compounds.

Examples of the non-aqueous electrolytes include a non-aqueous electrolytic solution prepared by dissolving an electrolyte salt in a non-aqueous solvent, a solid electrolyte (inorganic electrolyte or polymer electrolyte containing an electrolyte salt), and a solid or gel-like electrolyte prepared by mixing or dissolving an electrolyte in a polymer compound or the like.

The non-aqueous electrolytic solution is prepared by dissolving a salt in an organic solvent. The organic solvent can include any suitable type that has been generally used for batteries of this type. Examples of such organic solvents include propylene carbonate, ethylene carbonate, diethyl carbonate, dimethyl carbonate, 1,2-dimethoxyethane, 1,2-diethoxyethane, γ-butyrolactone, tetrahydrofuran, 2-methyl tetrahydrofuran, 1,3-dioxolane, 4-methyl-1,3-dioxolane, diethyl ether, sulfolane, methylsulfolane, acetonitrile, propionitrile, anisole, acetate, butyrate, propionate and the like. It is preferred to use cyclic carbonates such as propylene carbonate, or chain carbonates such as dimethyl carbonate and diethyl carbonate. These organic solvents can be used singly or in a combination of two types or more.

Additives or stabilizers may also be present in the electrolyte, such as VC (vinyl carbonate), VEC (vinyl ethylene carbonate), EA (ethylene acetate), TPP (triphenylphosphate), phosphazenes, LiBOB, LiBETI, LiTFSI, BP (biphenyl), PS (propylene sulfite), ES (ethylene sulfite), AMC (allylmethylcarbonate), and APV (divinyladipate). These additives are used as anode and cathode stabilizers or flame retardants, which may make a battery have higher performance in terms of formation, cycle efficiency, safety and life. Since each one of the cathode components in the mixture has unique chemistries it is particularly important to have an electrolyte that has additives suitable for SEI formation of each chemical. For instance a suitable electrolyte for a Li-ion battery having a spinel and cobaltate mixed cathode and a graphite anode may contain additives of LiBOB, PS and VC stabilizers, which respectively are suitable for the individual compounds' SEI formations.

The solid electrolyte can include an inorganic electrolyte, a polymer electrolyte and the like insofar as the material has lithium-ion conductivity. The inorganic electrolyte can include, for example, lithium nitride, lithium iodide and the like. The polymer electrolyte is composed of an electrolyte salt and a polymer compound in which the electrolyte salt is dissolved. Examples of the polymer compounds used for the polymer electrolyte include ether-based polymers such as polyethylene oxide and cross-linked polyethylene oxide, polymethacrylate ester-based polymers, acrylate-based polymers and the like. These polymers may be used singly, or in the form of a mixture or a copolymer of two kinds or more.

A matrix of the gel electrolyte may be any polymer insofar as the polymer is gelated by absorbing the above-described non-aqueous electrolytic solution. Examples of the polymers used for the gel electrolyte include fluorocarbon polymers such as polyvinylidene fluoride (PVDF), polyvinylidene-co-hexafluoropropylene (PVDF-HFP) and the like.

Examples of the polymers used for the gel electrolyte also include polyacrylonitrile and a copolymer of polyacrylonitrile. Examples of monomers (vinyl based monomers) used for copolymerization include vinyl acetate, methyl methacrylate, butyl methacylate, methyl acrylate, butyl acrylate, itaconic acid, hydrogenated methyl acrylate, hydrogenated ethyl acrylate, acrlyamide, vinyl chloride, vinylidene fluoride, and vinylidene chloride. Examples of the polymers used for the gel electrolyte further include acrylonitrile-butadiene copolymer rubber, acrylonitrile-butadiene-styrene copolymer resin, acrylonitrile-chlorinated polyethylene-propylene-diene-styrene copolymer resin, acrylonitrile-vinyl chloride copolymer resin, acrylonitrile-methacylate resin, and acrlylonitrile-acrylate copolymer resin.

Examples of the polymers used for the gel electrolyte include ether based polymers such as polyethylene oxide, copolymer of polyethylene oxide, and cross-linked polyethylene oxide. Examples of monomers used for copolymerization include polypropylene oxide, methyl methacrylate, butyl methacylate, methyl acrylate, butyl acrylate.

In particular, from the viewpoint of oxidation-reduction stability, a fluorocarbon polymer is preferably used for the matrix of the gel electrolyte.

The electrolyte salt used in the electrolyte may be any electrolyte salt suitable for batteries of this type. Examples of the electrolyte salts include $LiClO_4$, $LiAsF_6$, $LiPF_6$, $LiBF_4$, $LiB(C_6H_5)_4$, $LiB(C_2O_4)_2$, $CH_3SO_3Li$, $CF_3SO_3Li$, $LiCl$, $LiBr$ and the like.

Referring back to FIG. 1, in one embodiment of the invention, the separator 3 separates the positive electrode 1 from the negative electrode 2. The separator 3 can include any film-like material having been generally used for forming separators of non-aqueous electrolyte secondary batteries of this type, for example, a microporous polymer film made from polypropylene, polyethylene, or a layered combination of the two. In addition, if a solid electrolyte or gel electrolyte is used as the electrolyte of the battery 10, the separator 3 does not necessarily need to be provided. A microporous separator made of glass fiber or cellulose material can in certain cases also be used. Separator thickness is typically between 9 and 25 μm.

Positive electrode 2 is typically produced by mixing the cathode material at about 94 wt % together with about 3 wt % of a conductive agent (e.g. acetylene black), and about 3 wt % of a binder (e.g., PVDF). The mix is dispersed in a solvent (e.g., N-methyl-2-pyrrolidone (NMP)), in order to prepare a slurry. This slurry is then applied to both surfaces of an aluminum current collector foil, which typically has a thickness of about 20 um, and dried at about 100-150° C. The dried electrode is then calendared by a roll press, to obtain a compressed positive electrode.

The negative electrode is typically prepared by mixing about 93 wt % of graphite as a negative active material, about 3 wt % of conductive carbon (e.g. acetylene black), and about 4 wt % of a binder (e.g. PVDF). The negative electrode is then prepared from this mix in a process similar to that described above for positive electrode except that a copper current collector foil, typically of 10-15 μm thickness, is used.

The negative and positive electrodes and a separator formed of a polymer film (e.g., polyethylene) with micro pores, of thickness about 25 um, are laminated and spirally wound to produce a spiral type electrode element. Preferably this roll has an oblong shape.

One or more positive lead current carrying tabs are attached to the positive current collector and then welded to the battery top. A vent is also available, for example, at the top of the battery. A negative lead, made of nickel metal, connects the negative current collector to the bottom of the battery can.

An electrolyte containing for instance PC, EC, DMC, DEC solvents with 1M $LiPF_6$ and suitable additives at 0.5-3 wt. % each, such as VC, LiBOB, PF, LiTFSI, BP, is vacuum filled in the battery can 4 having the spirally wound "jelly roll", and the battery is then sealed via an insulating seal gasket 8. A safety valve 5c, current interrupt device, and a PTC device may also be present at the battery top to enhance safety. A cylindrical non-aqueous electrolyte lithium-ion secondary battery having an outer diameter of 18 mm and a height of 65 mm as shown in FIG. 1 is typical of lithium-ion cells used in the industry.

Figure 2:
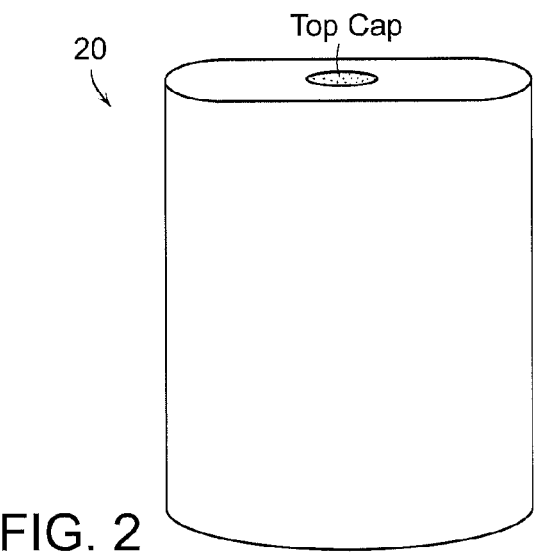
FIG. 2 is a schematic representation of an example of an oblong-shaped can for a lithium-ion battery of the invention.

For a cell having an oblong shape as shown in FIG. 2, a similar method as described above for a cylindrical cell of the invention can be used except that the electrodes are prepared and wound to form a cell having an oblong shape, for example, with a thickness of 17 or 18 mm, a width of 44 or 36 mm, a height of 65 mm.

The cells or batteries of the invention can be cylindrical or prismatic (stacked or wound), preferably prismatic, and more preferably of a prismatic shape that is oblong. Although the present invention can use all types of prismatic cans, an oblong can is preferred partly due to the two features described below.

Figure 5A:
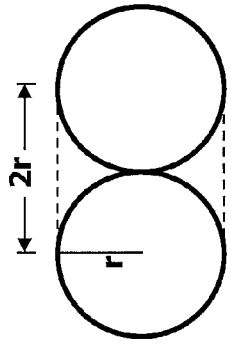
FIGS. 5(a)-5(d) are schematic drawings comparing different spatial utilizations of different battery form factors including the battery of this invention (FIG. 5(a)) and comparison examples typical of commercial batteries used today including two 18650 cells in parallel (FIG. 5(b)), a prismatic cell containing a wound jelly roll electrode structure (FIG. 5(c)) and a prismatic cell containing a stacked electrode structure (FIG. 5(d)).
Figure 5B:
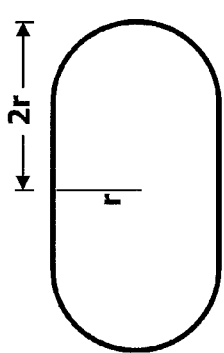

As shown in FIGS. 5(a)-5(d), the available internal volume of an oblong shape, such as the 183665 form factor, is larger than the volume of two 18650 cells, when comparing stacks of the same external volume. In particular, FIGS. 5(a)-(b) show a comparison of an oblong cross section (FIG. 5(a)) to a cylindrical cross section for two 18650 cells (FIG. 5(b)). The additional useable space is 12%. When assembled into a battery pack, the oblong cell fully utilizes more of the space that is occupied by the battery pack. This enables novel design changes to the internal cell components that can increase key performance features without sacrificing cell capacity relative to that found in the industry today. Design features such as mixing in components of higher safety, but relatively lower capacity, while still realizing high capacity on the pack level is therefore available. In addition, again due to the larger available volume, one can elect to use thinner electrodes which have relatively higher cycle life. The thinner electrodes also have higher rate capability. Furthermore an oblong (or prismatic) can has larger flexibility. For instance, an oblong shape can flex more at the waist point compared to a cylindrically shaped can, which allows less flexibility as stack pressure is increasing upon charging. The increased flexibility decreases mechanical fatigue on the electrodes, which in turn causes higher cycle life. Also, separator pore clogging is improved by the relatively lower stack pressure.

Figure 5C:
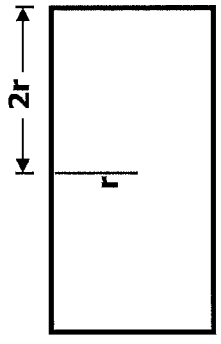
Figure 5D:
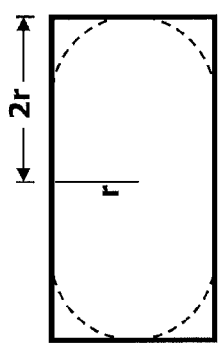
Figure 6:
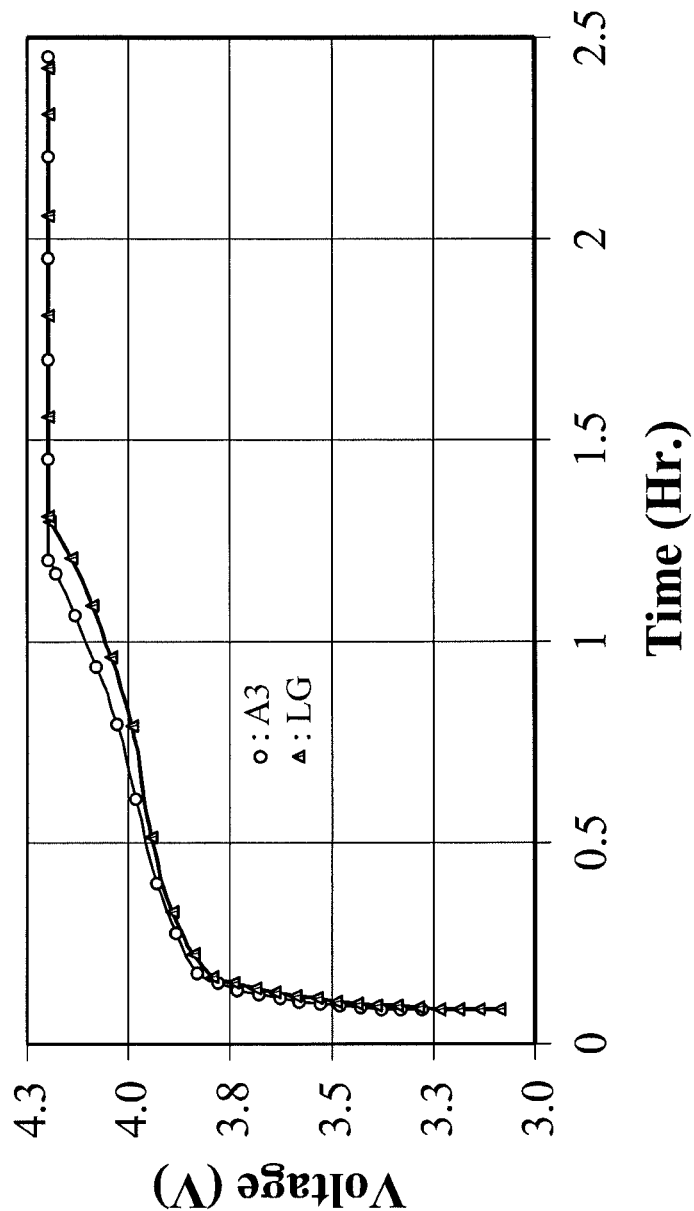
FIG. 6 is a graph showing typical charge curves of a battery of the invention and a control battery at room temperature.
Figure 7:
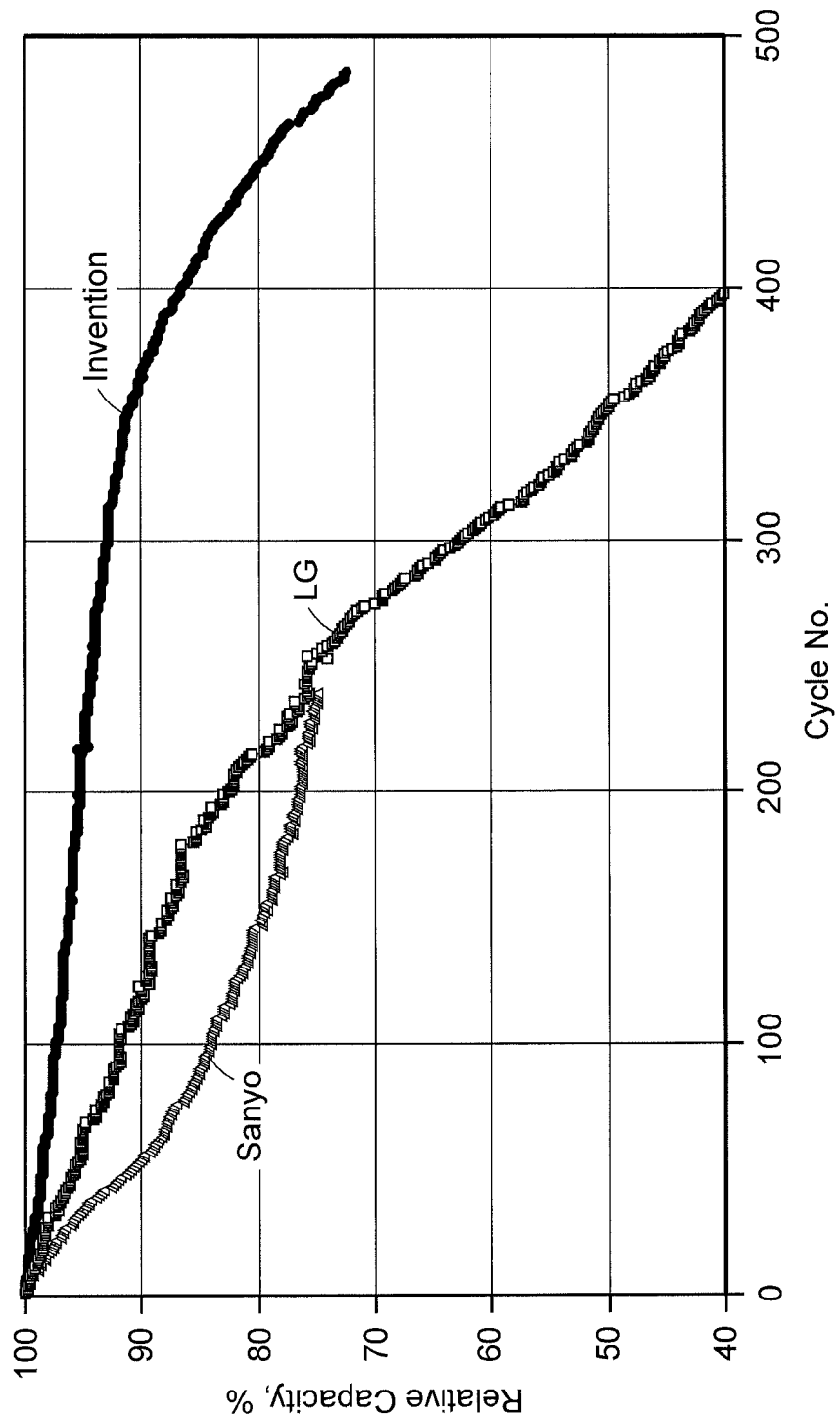
FIG. 7 is a graph showing relative capacity retention during charge-discharge cycling at room temperature of a battery of the invention and two control batteries: cycling conditions: constant charge constant voltage (CCCV) charging using 0.7 C constant charge followed by constant voltage charge at 4.2 V and then 1 C discharge to 2.75 V.
Figure 8:
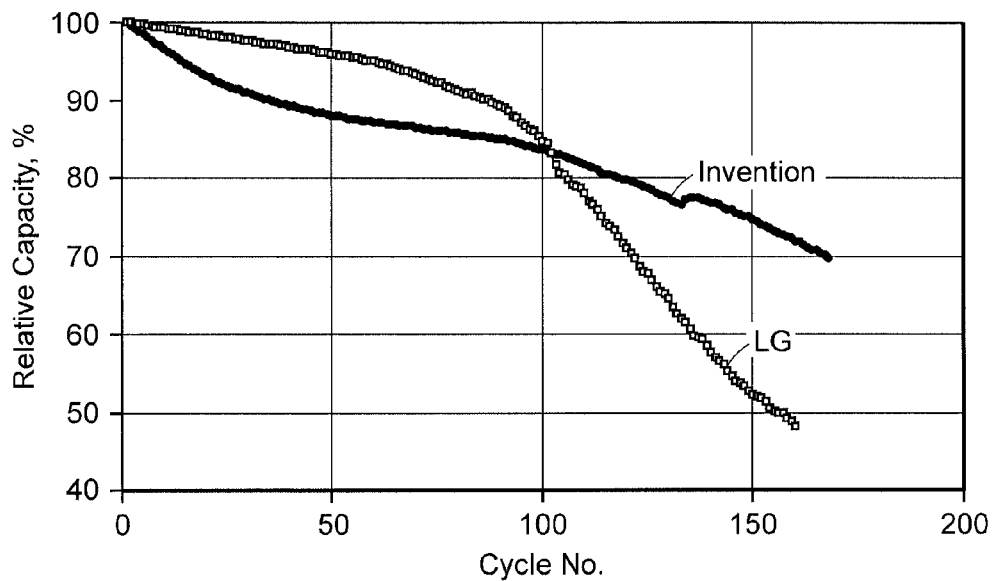
FIG. 8 is a graph showing relative capacity retention during charge-discharge cycling at 60° C. of a battery of the invention and a control battery under the conditions described in FIG. 7.

A particularly desired feature, allowing relatively higher safety, is available for the oblong shaped can compared to the prismatic can whose cross-section is illustrated in FIG. 5(c). The oblong shape provides a snug fit to the jelly roll, which minimizes the amount of electrolyte necessary for the battery. The relatively lower amount of electrolyte results in less available reactive material during a misuse scenario and hence higher safety. In addition, cost is lower due to a lower amount of electrolyte. In the case of a prismatic can with a stacked electrode structure, whose cross-section is illustrated in FIG. 5(d), full volume utilization is possible without unnecessary electrolyte, but this type of can design is more difficult and hence more costly from a manufacturing point-of-view.

In another aspect, the present invention is directed to a battery pack including one or more cells as described above for the lithium-ion batteries of the invention.

In a preferred embodiment, the battery pack includes a plurality of cells and each of the cells includes an active cathode material described above. Cells of a battery packs of the invention are connected with each other in series or parallel, or in series and in parallel (e.g., packs having 2 cells in parallel and 3 cells in series, a so-called 2p3s configuration). In a specific embodiment, each cell of the battery pack of the invention includes an active cathode material including a mixture that includes: at least one of a lithium cobaltate and a lithium nickelate; and at least one of a manganate spinel represented by an empirical formula of $Li_{(1+x1)}(Mn_{1-y1}A'_{y1})_{2-x1}O_{z1}$ described above and an olivine compound represented by an empirical formula of $Li_{(1-x2)}A''_{x2}MPO_4$ described above. In another specific embodiment, each cell of the battery pack includes an active cathode material including a mixture that includes: at least one of a lithium cobaltate and a lithium nickelate selected from the group consisting of $LiCoO_2$-coated $LiNi_{0.8}Co_{0.15}Al_{0.05}O_2$, and $Li(Ni_{1/3}Co_{1/3}Mn_{1/3})O_2$; and a manganate spinel having an empirical formula of $Li_{(1+x7)}Mn_{2-y7}O_{z7}$ described above. At least one cell of the battery pack has a capacity greater than about 3.0 Ah/cell. In yet another specific embodiment, each cell of the battery pack includes an active cathode material including a mixture that includes: a lithium nickelate selected from the group consisting of $LiCoO_2$-coated $LiNi_{0.8}Co_{0.15}Al_{0.05}O_2$, and $Li(Ni_{1/3}Co_{1/3}Mn_{1/3})O_2$; and a manganate spinel having an empirical formula of $Li_{(1+x7)}Mn_{2-y7}O_{z7}$ described above. Preferably, at least one cell of the cells included in the battery pack has a capacity greater than about 3.0 Ah/cell.

In a more preferred embodiment, the battery pack includes a plurality of cells, and the cells of a battery pack of the invention are connected only in series and no cells are connected in parallel. Such a configuration is demonstrated schematically in FIG. 3 and FIG. 4. The non-parallel feature of the pack allows less expensive individual control and monitoring of each cell in the pack, without having to incorporate extra circuitry for detection of individual cell parameters for cells connected in parallel, which is costly and cumbersome due to incorporation of extra algorithms in software and probe terminals.

Figure 3:
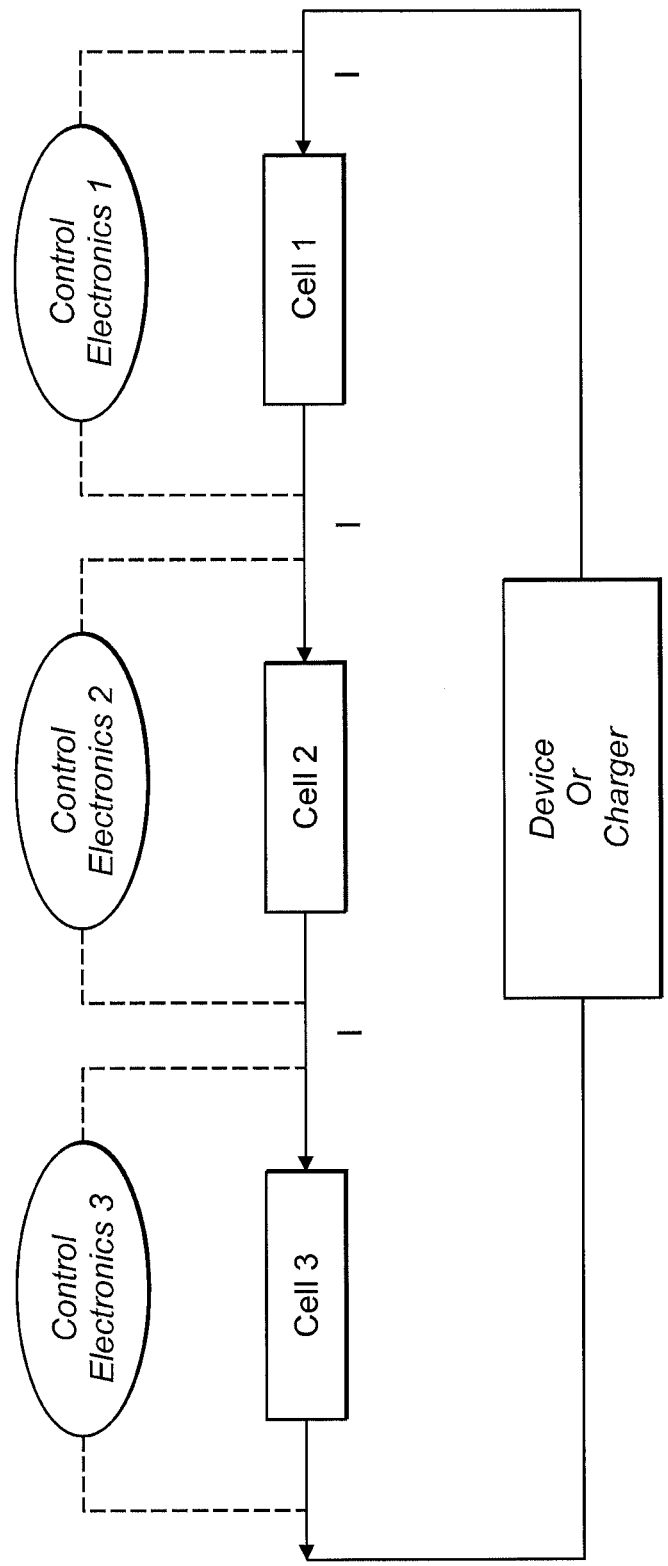
FIG. 3 is a schematic circuitry showing how cells in the invention are preferably connected when arranged together in a battery pack.

FIG. 3 shows one embodiment of the invention showing three cells of the invention connected in series. These cells, due to their safer performance characteristics, can be made larger compared to cells employing $LiCoO_2$ as the choice of cathode active material. This allows connecting cells into packs, having fewer cells connected in parallel.

Figure 4:
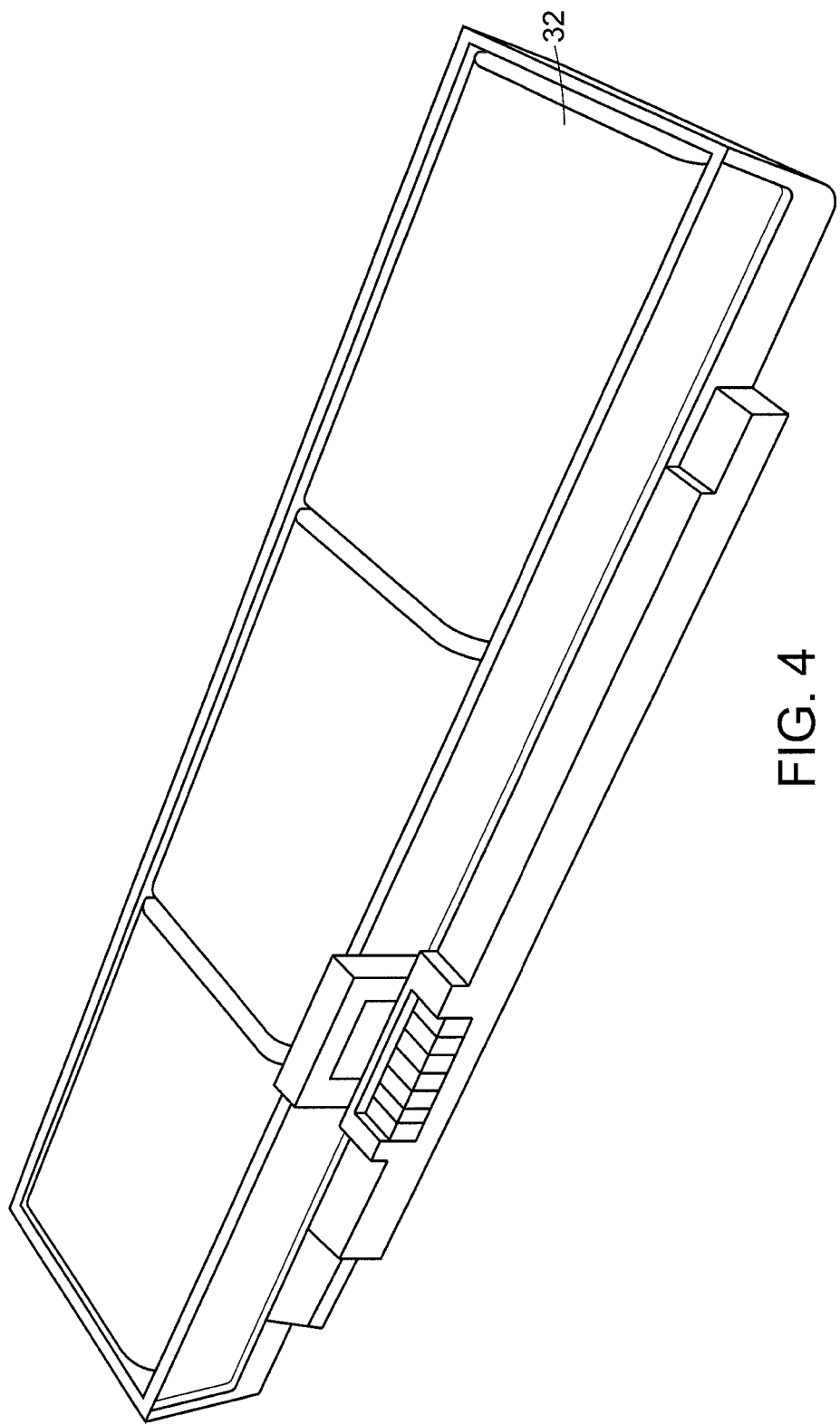
FIG. 4 is a photographic top, see-through view of a battery pack of the invention.

FIG. 4 shows a top, see-through view of battery pack 30 of the invention where three cells 32 of the invention are connected in series with each other.

In one specific embodiment, the battery packs of the invention have a 2p3s configuration where cells are assembled in packs having 2 cells in parallel and 3 cells in series, as can be seen in the conventional 18650 type cells typically used for laptop markets currently. In other embodiments, the battery packs of the invention have 3s or 4s configurations, taking advantage of the larger cell capacity enabled by the invention to simplify, and therefore lower cost and improve safety, the resulting battery pack.

Preferably, the cells included in the battery pack have oblong-shaped can 20 as shown generally in FIG. 2. The preference for this shape is illustrated in FIG. 5 and includes full volume utilization, no unnecessary electrolyte inside the cell can, and relative ease of manufacturing. The capacity of the cells in the battery pack is typically equal to or greater than about 3.3 Ah. The internal impedance of the cells is preferably less than about 50 milliohms, more preferably less than 30 milliohms.

A new battery design of the invention described above can use a larger cell sizes and can potentially replace two parallel 18650 cells (2p block). An advantage of using this configuration is that control electronics can monitor only one cell in the block instead of two, which is the case for a 2p block of 18650 cells. This type of monitoring can allow detection of defects, such as shorts, in the cells, errors that may not be detected for a block having one defect and one non-defect cell. In addition, cost advantages can be realized by using relatively less battery components such as PTC and CID devices and electronic wiring, which connects cells in parallel and to control circuitry, per battery pack.

In order to raise capacity in 18650 cells, companies such as Sony, Sanyo, MBI (Panasonic), LG, and Samsung have been gradually increasing the packing level of active material (graphite and cobaltate) in the cell since their implementation in the early 90's. The higher degree of packing has in part been accomplished by increasing electrode dimensions in terms of electrode width, increased densification of electrodes, increased thickness of the electrodes, less tolerance on the overcapacity of the anode capacity/cathode capacity ratio, and a tighter fit of the jelly roll in the battery steel can. However, one drawback of these approaches has been less safety as seen by an increased level of safety incidents in the field lately. Another drawback is a decreased cycle life. Also, a typical 18650 cell can is made by steel. As capacity of this type cell has increased, so has the density and thickness of electrodes, along with the degree of packing of the jelly roll in the can. The graphite and metal oxide particulates in the anode and cathode electrodes of the 18650 cell continuously change their dimensions as lithium is intercalated and de-intercalated upon charging and discharging. Many metal oxide materials increase their size, due to increase in lattice parameters, when lithium is removed from the structure. $LiCoO_2$ and $LiNiO_2$ are two examples of cathode materials that increase their c-axis when lithium is gradually removed from the structure. Similarly, when lithium is inserted into graphite the c-axis lattice parameter is increased. This means that upon charging, a battery containing $LiCoO_2$- and graphite-based electrodes, both the anode and the cathode electrodes increase their thickness. This generally leads to an increased stack pressure in the cell, as the steel can limit expansion. Two typical types of degradation in the cylindrical, conventional $LiCoO_2$-based lithium cells are believed to be: (1) increased stack pressure imposed by the sturdy cylindrical steel can causes electrodes to clog the separator pores, and (2) mechanical fatigue of relatively thick electrodes causes the electrodes to degrade earlier due to poor connectivity leading to decreased electronic conductivity.

On the other hand, the invention described herein realizes that combinations of electrode materials for the cathode having two or more active material components, one having high capacity, the other having a relatively higher safety, can allow for lithium-ion batteries of high safety while at the same time achieving high capacity in battery packs employing those cells, in particular oblong-shaped cells. In addition, not only are the cells safe enough and of high enough capacity for commercialization objectives, but they also exhibit significantly high cycle life. For example, oblong-shaped cells having an external dimension of about 64 mm in height, about 36 mm in width and about 18 mm in thickness (see Example 4) showed higher voltage, better cycle life and better rate capability than commercially available 18650 cells from LG and SANYO (see Example 6). Lager cells having superior cycle life, high safety, and high capacity can also be made by utilizing the present invention. Even for powercells, it is believed that the present invention can replace power cells of 18650-type or 26 mm diameter in the art. Also HEV-type batteries can benefit from the present invention.

In yet another aspect, the present invention also includes a system that includes a portable electronic device and a cell or battery (e.g., lithium-ion battery), and battery pack as described above. Examples of the portable electronic devices include portable computers, power tools, toys, portable phones, camcorders, PDAs and hybrid-electric vehicles. In one embodiment, the system includes a battery pack of the invention. Features of the battery pack are as described above.

The invention is illustrated by the following examples which are not intended to be limiting in any way.

EXEMPLIFICATION

Example 1-3 and a Comparative Example

Using known active cathode material performance properties that include discharge capacity, average discharge voltage, first discharge vs. first charge efficiency, and material density, performance features can be compared for batteries resulting from mixtures of cathode materials. For a lithium-ion battery as described above, a cathode is used that consists of a mixture of active cathode materials that includes lithium cobaltate (x %), manganate spinel (y %), and lithium nickelate (z %). The manganate spinel and lithium nickelate cathode materials are of the preferred type mentioned in the descriptive text above. Performance features for these cathode materials are representative of individual cathode materials in their representative class and for capacity, average discharge voltage, first cycle efficiency, and density are: lithium cobaltate—145 mAh/g, 3.70 V, 96.0%, 4.9 g/cm$^3$; manganate spinel—115 mAh/g, 3.80 V, 94.0%, 4.1 g/cm$^3$; lithium nickelate—180 mAh/g, 3.50 V, 92.0%, 4.6 g/cm$^3$. For the case when x=40, y=60, and z=0, the resulting active cathode material of this example has the properties of 127 mAh/g, 3.75 V, 94.8%, and 4.4 g/cm$^3$.

Designing a fixed capacity 5 Ah lithium-ion cell and allowing the weight of the battery to vary in order that the capacity requirement is achieved, allows calculation of key battery performance and cost features for comparison under different cathode scenarios. Additional key parameters that must be fixed in the battery design include cell cross-sectional area (4.4×6.4 cm), cell thickness (1.85 cm), cathode coating area (2079 cm$^2$), cathode electrode area (2×1099 cm$^2$), anode coating area (2181 cm$^2$), anode electrode area (2×1127 cm$^2$), separator area (2416 cm$^2$), Al case thickness (500 μm) and density (3.70 g/cm$^3$), coated cathode formulation (94% active material, 3% conductive carbon, 3% binder), cathode conductive carbon material density (1.50 g/cm$^3$), cathode binder material density (1.80 g/cm$^3$), cathode porosity (20%), cathode Al foil thickness (15 μm) and density (2.70 g/cm$^3$), coated anode formulation (93% active material, 2% conductive carbon, 5% binder), anode active material capacity (330 mAh/g) and density (2.20 g/cm$^3$), anode first discharge vs. first charge efficiency (93%), anode conductive carbon material density (1.50 g/cm$^3$), anode binder material density (1.80 g/cm$^3$), anode porosity (30%), Cu anode foil thickness (12 μm) and density (8.90 g/cm$^3$), anode/cathode capacity ratio (1.1), separator thickness (25 μm) and porosity (45%), electrolyte density (1.20 g/cm$^3$), cell insulator and tab weight (1.00 g), coating solvent identity (NMP) and fraction (60% by volume), and associated material cost parameters.

The lithium-ion battery resulting from use of the cathode material described in this example has properties as shown in Table 2.

TABLE 2

| Cathode Material | Energy Density (Wh/L) | Cost ($/Wh) | Cell Material Cost for Pack of 3 Cells ($) | Advantage vs. LiCoO$_2$ |
|---|---|---|---|---|
| Example 1 (x = 40, y = 60, z = 0) | 407 | 0.176 | 13.76 | Energy Density, Cost, Safety |
| Example 2 (x = 15, y = 15, z = 70) | 406 | 0.162 | 12.64 | Energy Density, Cost, Safety |
| Example 3 (x = 20, y = 60, z = 20) | 404 | 0.166 | 12.85 | Energy Density, Cost, Safety |
| Comparative Example 1 (x = 100) | 401 | 0.208 | 15.97 | |

Example 4

An Oblong Cell with High Capacity Having an Active Cathode Material Including LiCoO$_2$/LiMn$_2$O$_4$ 94 wt. % mixed cathode with a weight ratio of 70:30 for LiCoO$_2$:LiMn$_2$O$_4$, 3 wt. % of carbon black and 3 wt. % of PVDF were mixed in NMP under stirring. The electrode slurry was coated onto a 15 micrometer thick Al current collector. The Al current collector had a dimension of width of 56 mm and length of 1568 mm. The slurry was coated on both sides of the Al current collector. The coating length was 1510 and 1430 mm for side 1 and side 2. The process media NMP was removed by heating the coated electrode at 150° C. for a few minutes. The electrode was pressed to control the coated density. The 2-side coating was identical in every aspect. The thickness of the total electrode was 140 micrometers. The composite cathode density was 3.6 g/cc. Two Al tabs with about a width of 3 mm, length of 55 mm and thickness of 0.2 mm were welded onto the uncoated Al current collector.

93 wt. % of graphite, 2 wt. % of carbon black and 5 wt. % of PVDF binder were mixed in NMP under stirring. The electrode slurry was coated onto a 12 micrometer thick Cu current collector. The Cu current collector had a dimension of width of 57.5 mm and length of 1575 mm. The slurry was coated on both sides of the Cu current collector. The coating length was 1495 and 1465 mm for side 1 and side 2 respectively. The process media NMP was removed by heating the coated electrode at 150° C. for a few minutes. The electrode was pressed to control the coated density. The 2-side coating was identical in every aspect. The thickness of the total electrode was 130 micrometers. The composite anode density was 1.8 g/cc. Two Ni tabs with about a width of 3 mm, length of 55 mm and thickness of 0.2 mm was welded onto the uncoated Cu current collector.

The cathode and anode were separated by a microporous separator, with a thickness of 25 micrometers, width of 60 mm and length of 310 cm. They were wounded into a jelly-roll. The jelly-roll was pressed into a prismatic format.

The pressed jelly-roll was inserted into a prismatic Al case, with Al thickness of 0.4 mm. The case had an external dimension of about 64 mm in height, 36 mm in width and 18 mm in thickness. The positive tab was welded on to the top Al cap, and the negative tab was welded onto a connection passing through the Al case. An Al cap was welded onto the Al case. Approximately 10 g 1M LiPF$_6$ EC/PC/EMC/DMC electrolyte solution was added into the cell under vacuum. After formation, the cell was completely sealed.

This cell had a capacity of 4.4 Ah at C/5 discharge rate. The nominal voltage was 3.7 V. The total cell weight was approximately 89 g. The cell energy density was approximately 183 Wh/kg and 440 Wh/liter.

Example 5A

Prophetic Example

A Cell with an Active Cathode Material Including $LiCoO_2/LiMn_{1.9}Al_{0.1}O_4$ In this example, a prismatic cell with an active cathode material including $LiCoO_2/LiMn_{1.9}Al_{0.1}O_4$ is designed. This cell can be made by a similar procedure as described above in Example 4. For this example, the cathode mix includes 94 wt. % of mixed cathode with a weight ratio of 70:30 for $LiCoO_2$:$LiMn_{1.9}Al_{0.10}O_4$, 3 wt. % of carbon black and 3 wt. % of PVDF. The electrode slurry is coated onto a 15 micrometer thick Al current collector. The Al current collector has a dimension of width of 56 mm and length of 1913 mm. The slurry is coated on both sides of the Al current collector. The coating length is 1913 and 1799 mm for side 1 and side 2. The process media NMP is removed by heating the coated electrode at 150° C. for a few minutes. The electrode is pressed to control the porosity of 25% volume. The 2-side coating is identical in every aspect. The thickness of the single coating layer is 50 micrometers. The composite cathode density is 3.36 g/cc. An Al tab with a width of 5 mm, length of 64 mm and thickness of 0.1 mm is welded onto the uncoated Al current collector.

93 wt. % of graphite, 2 wt. % of carbon black and 5 wt. % of PVDF binder is mixed in NMP under stirring. The electrode slurry is coated onto a 12 micrometer thick Cu current collector. The Cu current collector has a dimension of width of 58 mm and length of 1940 mm. The slurry is coated on both sides of the Cu current collector. The coating length is 1903 and 1857 mm for side 1 and side 2 respectively, leaving 10 mm Cu uncoated. The process media NMP is removed by heat the coated electrode at 150° C. for a few minutes. The electrode is pressed to control the porosity of 37% volume. The 2-side coating is identical in every aspect. And the thickness of the single coating layer is 53 micrometers. The calculated composite anode density is 1.35 g/cc. A Ni tab with a width of 5 mm, length of 64 mm and thickness of 0.5 mm can be welded onto the uncoated Cu current collector.

The cathode and anode are separated by a microporous separator, with a thickness of 25 micrometers, width of 60 mm and length of 4026 mm. They are then wounded into a jelly-roll. The jelly-roll is pressed into a prismatic format.

The pressed jelly-roll is inserted into a rectangular Al case, with Al thickness of 0.5 mm. The case has an external dimension of 64 mm in height, 44 mm in width and 17 mm in thickness. The positive tab is welded on to the top Al cap, and the negative tab is welded onto the Al case. An Al cap is welded onto the Al case. Approximately 12.3 g 1M $LiPF_6$ EC/EMC/DMC electrolyte solution is added into the cell under vacuum. After formation, the cell is completely sealed.

This cell has a calculated capacity of 4.5 Ah at C/5 discharge rate. The calculated nominal voltage is 3.7V. The total calculated cell weight is approximately 96 g. The calculated cell energy density is approximately 174 Wh/kg and 350 Wh/L.

Example 5B

Prophetic Example

A Cell with an Active Cathode Material Including $LiCoO_2/LiMn_{1.9}Al_{0.1}O_4/LiNi_{0.8}Co_{0.15}Al_{0.05}O_2$ In this example, a prismatic cell with an active cathode material including $LiCoO_2/LiMn_{1.9}Al_{0.1}O_4/LiNi_{0.8}Co_{0.15}Al_{0.05}O_2$ is designed. This cell can be made by a similar procedure as described above in Example 4:

94 wt. % of mixed cathode with a weight ratio of 10:50:40 for $LiCoO_2$:$LiMn_{1.9}Al_{0.1}O_4$:$LiNi_{0.8}Co_{0.15}Al_{0.05}O_2$, 3 wt. % of carbon black and 3 wt. % of PVDF are mixed in NMP under stirring. The electrode slurry is coated onto a 15 micrometer thick Al current collector. The Al current collector has a dimension of width of 56 mm and length of 1913 mm. The slurry is coated on both sides of the Al current collector. The coating length is 1913 and 1799 mm for side 1 and side 2. The process media NMP is removed by heat the coated electrode at 150° C. for a few minutes. The electrode is pressed to control the porosity of 25% volume. The 2-side coating is identical in every aspect. And the thickness of the single coating layer is 56 micrometers. The calculated composite cathode density is 3.2 g/cc. An Al tab with a width of 5 mm, length of 64 mm and thickness of 0.1 mm is welded onto the uncoated Al current collector.

93 wt. % of graphite, 2 wt. % of carbon black and 5 wt. % of PVDF binder are mixed in NMP under stirring. The electrode slurry is coated onto a 12 micrometer thick Cu current collector. The Cu current collector has a dimension of width of 58 mm and length of 1940 mm. The slurry is coated on both sides of the Cu current collector. The coating length is 1903 and 1857 mm for side 1 and side 2 respectively, leaving 10 mm Cu uncoated. The process media NMP is removed by heat the coated electrode at 150° C. for a few minutes. The electrode is pressed to control the porosity of 37% volume. The 2-side coating is identical in every aspect. The thickness of the single coating layer is 60 micrometers. The calculated composite anode density is 1.35 g/cc. A Ni tab with a width of 5 mm, length of 64 mm and thickness of 0.5 mm is welded onto the uncoated Cu current collector.

The cathode and anode are separated by a microporous separator, with a thickness of 25 micrometers, width of 60 mm and length of 4026 mm. They are wounded into a jelly-roll. The jelly-roll is then pressed into a prismatic format.

The pressed jelly-roll is inserted into a rectangular Al case, with Al thickness of 0.5 mm. The case has an external dimension of 64 mm in height, 44 mm in width and 17 mm in thickness. The positive tab is welded on to the top Al cap, and the negative tab is welded onto the Al case. An Al cap is welded onto the Al case. Approximately 12.3 g 1M $LiPF_6$ EC/EMC/DMC electrolyte solution is added into the cell under vacuum. After formation, the cell is completely sealed.

This cell has a calculated capacity of 5 Ah at C/5 discharge rate. The calculated nominal voltage is 3.67V. The total calculated cell weight is approximately 101 g. The calculated cell energy density is approximately 181 Wh/kg and 362 Wh/L.

Example 6

Cell Tests

The cell of Example 4 was cycled (i.e. charged and discharged) as follows:

The cell was charged with a constant current of 0.7 C to a voltage of 4.2 V and then was charged using a constant voltage of 4.2 V. The constant voltage charging was ended when the current reached 44 mA. After resting at the open circuit state for 30 minutes, it was discharged with a constant current of C/5. The discharge ended when the cell voltage reached 2.75 V. These procedures were repeated for 3 times.

Then the cell was charged with a constant current of 0.7 C to a voltage of 4.2 V and then subsequently was charged using a constant voltage of 4.2 V. The constant voltage charging was ended when the current reached 44 mA. After resting at the open circuit state for 30 minutes, it was discharged with a constant current of 1 C. The discharge ended when the cell voltage reached 2.75 V. These procedures repeated continuously to obtain cycle life data.

For rate capability testing, eight cells were charged as described about and discharge was performed to 2.75 V using different current rates ranging in value from C/5 to 2 C.

Figure 9:
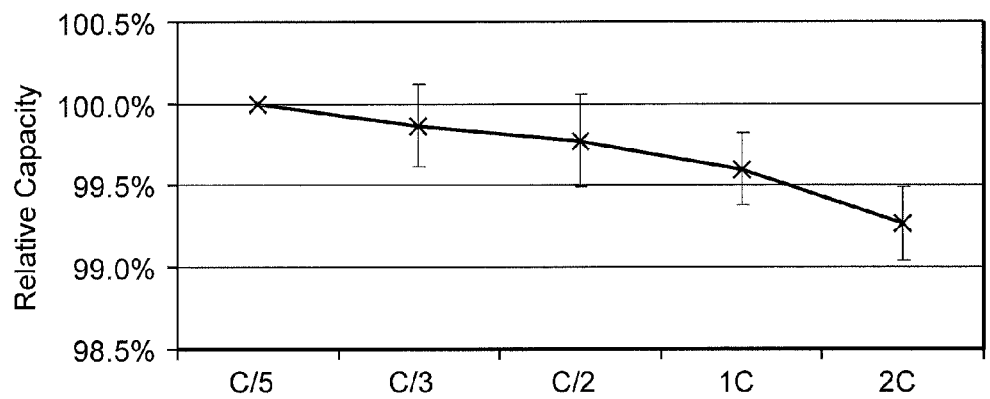
FIG. 9 is a graph showing the rate capability for an average and standard deviation of eight batteries of the invention and two control commercial 18650 batteries where the batteries are charged under the charge conditions described in FIG. 7 and discharged to 2.75 V at the rates indicated in the figure.

As a comparison example, an LG 18650 of LG in Seoul, Korea ("LG") and a SANYO 18650 cell were tested with the procedures described above. Cells were typically tested at 23° C. (room temperature) and 60° C. Results of the cell tests were shown in FIGS. 6-9. As can be seen in FIGS. 6-9, a cell of the present invention showed higher voltage (FIG. 6), better cycle life at room temperature (FIG. 7), better cycle life at 60° C., (FIG. 8) and better rate capability (FIG. 9).

EQUIVALENTS

While this invention has been particularly shown and described with references to preferred embodiments thereof, it will be understood by those skilled in the art that various changes in form and details may be made therein without departing from the scope of the invention encompassed by the appended claims.

What is claimed is:

1. A lithium-ion battery having a cathode that includes an active cathode material, the active cathode material comprising:
   a) a mixture that includes
      i) at least one of a lithium cobaltate and a lithium nickelate, wherein the lithium cobaltate is a modified lithium cobaltate, having a lithium modifier and, optionally, a cobalt modifier of the lithium cobaltate, and wherein the lithium modifier is magnesium (Mg), and wherein the cobalt modifier is at least one member of the group consisting of manganese (Mn), aluminum (Al), boron (B), titanium (Ti), magnesium (Mg), calcium (Ca) and strontium (Sr), and wherein the lithium nickelate is selected from the group consisting of $Li(Ni_{1/3}Co_{1/3}Mn_{1/3})O_2$; a lithium nickelate that includes at least one Li atom modifier selected from the group consisting of barium, magnesium, calcium and strontium; and a lithium nickelate represented by an empirical formula of $Li_{x3}Ni_{(1-z3)}M'_{z3}O_2$ coated with $LiCoO_2$ as a gradient coating or a spot-wise coating where:
      x3 is greater than 0.05 and less than 1.2,
      z3 is greater than 0 and less than 0.5, and
      M' is at least one member of the group consisting of cobalt, manganese, aluminum, boron, titanium, magnesium, calcium and strontium; and
      ii) at least one of a manganate spinel and an olivine compound, wherein the manganate spinel is represented by an empirical formula of $Li_{(1+x1)}(Mn_{1-y1}A'_{y1})_{2-x1}O_{z1}$ where:

x1 is equal to or greater than 0.01 and equal to or less than 0.3,
      y1 is greater than 0.0 and equal to or less than 0.3,
      z1 is equal to or greater than 3.9 and equal to or less than 4.1, and
      A' is at least one member of the group consisting of magnesium, aluminum, cobalt, nickel and chromium,
      and wherein the olivine compound is represented by an empirical formula of $Li_{(1-x2)}A''_{x2}MPO_4$ where:

x2 is equal to or greater than 0.05 and equal to or less than 0.2, or x2 is equal to or greater than 0.0 and equal to or less than 0.1
      M is at least one member of the group consisting of iron, manganese, cobalt and magnesium, and
      A'' is at least one member of the group consisting of sodium, magnesium, calcium, potassium, nickel and niobium; or
   b) a mixture that includes
      i) a lithium nickelate selected from the group consisting of $Li(Ni_{1/3}Co_{1/3}Mn_{1/3})O_2$; a lithium nickelate that includes at least one Li atom modifier selected from the group consisting of barium, magnesium, calcium and strontium, and a lithium nickelate represented by an empirical formula of $Li_{x3}Ni_{(1-z3)}M'_{z3}O_2$ coated with $LiCoO_2$ as a gradient coating or a spot-wise coating where:
      x3 is greater than 0.05 and less than 1.2,
      z3 is greater than 0 and less than 0.5, and
      M' is at least one member of the group consisting of cobalt, manganese, aluminum, boron, titanium, magnesium, calcium and strontium; and
      ii) a manganate spinel represented by an empirical formula of $Li_{(1+x7)}Mn_{2-y7}O_{z7}$ where x7 and y7 are each independently equal to or greater than 0.0 and equal to or less than 1.0; and z7 is equal to or greater than 3.9 and equal to or less than 4.2.

2. The lithium-ion battery of claim 1, wherein the active cathode material includes a mixture that includes:
   i) at least one of the modified lithium cobaltate, and the lithium nickelate selected from the group consisting of $Li(Ni_{1/3}Co_{1/3}Mn_{1/3})O_2$, the Li-modifier-containing lithium nickelate, and the $LiCoO_2$-coated lithium nickelate; and
   ii) at least one of the manganate spinel represented by an empirical formula of $Li_{(1+x1)}(Mn_{1-y1}A'_{y1})_{2-x1}O_{z1}$ and the olivine compound represented by an empirical formula of $Li_{(1-x2)}A''_{x2}MPO_4$.

3. The lithium-ion battery of claim 2, wherein the cathode material includes the Li-modifier-containing lithium nickelate.

4. The lithium-ion battery of claim 3, wherein the Li-modifier-containing lithium nickelate further includes at least one Ni atom modifier selected from the group consisting of barium, magnesium, calcium, strontium, aluminum, manganese and boron.

5. The lithium-ion battery of claim 2, wherein the cathode material includes the $LiCoO_2$-coated lithium nickelate.

6. The lithium-ion battery of claim 5, wherein the $LiCoO_2$-coated lithium nickelate is $LiNi_{0.8}Co_{0.15}Al_{0.05}O_2$ coated with $LiCoO_2$ as a gradient coating or a spot-wise coating.

7. The lithium-ion battery of claim 2, wherein the cathode material includes the olivine compound of $Li_{(1-x2)}A''_{x2}MPO_4$ where M is iron or manganese.

8. The lithium-ion battery of claim 7, wherein the olivine compound is $LiFePO_4$ or $LiMnPO_4$.

9. The lithium-ion battery of claim 2, wherein the cathode material includes one of the lithium nickelate selected from the group consisting of $Li(Ni_{1/3}Co_{1/3}Mn_{1/3})O_2$, the Li-modifier-containing lithium nickelate, and the $LiCoO_2$-coated lithium nickelate; and further includes the manganate spinel of $Li_{(1+x1)}(Mn_{1-y1}A'_{y1})_{2-x1}O_{z1}$.

10. The lithium-ion battery of claim 2, wherein the cathode material includes one of the lithium nickelate selected from the group consisting of $Li(Ni_{1/3}Co_{1/3}Mn_{1/3})O_2$, the Li-modifier-containing lithium nickelate, and the $LiCoO_2$-coated lithium nickelate; and further includes the manganate spinel of $Li_{(1+x1)}(Mn_{1-y1}A'_{y1})_{2-x1}O_{z1}$ and the modified lithium cobaltate.

11. The lithium-ion battery of claim 2, wherein the cathode material includes the modified lithium cobaltate, and the manganate spinel of $Li_{(1+x1)}(Mn_{1-y1}A'_{y1})_{2-x1}O_{z1}$.

12. The lithium-ion battery of claim 2, wherein the cathode material includes the modified lithium cobaltate and/or one of the lithium nickelate selected from the group consisting of $Li(Ni_{1/3}Co_{1/3}Mn_{1/3})O_2$, —the Li-modifier-containing lithium nickelate, and the $LiCoO_2$-coated lithium nickelate; and further includes the olivine compound of $Li_{(1-x2)}A''_{x2}MPO_4$.

13. The lithium-ion battery of claim 2, wherein the cathode material includes one of the lithium nickelate selected from the group consisting of $Li(Ni_{1/3}Co_{1/3}Mn_{1/3})O_2$, the Li-modifier-containing lithium nickelate, and the $LiCoO_2$-coated lithium nickelate; and further includes the olivine compound of $Li_{(1-x2)}A''_{x2}MPO_4$.

14. The lithium-ion battery of claim 1, wherein the active cathode material includes a mixture that includes
   i) the lithium nickelate selected from the group consisting of $Li(Ni_{1/3}Co_{1/3}Mn_{1/3})O_2$, —the Li-modifier-containing lithium nickelate, and the $LiCoO_2$-coated lithium nickelate; and
   ii) the manganate spinel represented by an empirical formula of $Li_{(1+x7)}Mn_{2-y7}O_{z7}$.

15. The lithium-ion battery of claim 14, wherein the cathode material includes the Li-modifier-containing lithium nickelate.

16. The lithium-ion battery of claim 15, wherein the Li-modifier-containing lithium nickelate further includes at least one Ni atom modifier selected from the group consisting of barium, magnesium, calcium, strontium, aluminum, manganese and boron.

17. The lithium-ion battery of claim 15, wherein the manganate spinel is $LiMn_2O_4$.

18. The lithium-ion battery of claim 15, further comprising a lithium cobaltate.

19. The lithium-ion battery of claim 18, wherein the lithium cobaltate is $LiCoO_2$.

20. The lithium-ion battery of claim 14, wherein the mixture further includes an olivine compound represented by an empirical formula of $Li_{(1-x2)}A''_{x2}MPO_4$ where:

x2 is equal to or greater than 0.05 and equal to or less than 0.2, or x2 is equal to or greater than 0.0 and equal to or less than 0.1; and M is at least one member of the group consisting of iron, manganese, cobalt and magnesium; and A'' is at least one member of the group consisting of sodium, magnesium, calcium, potassium, nickel and niobium.

21. An active cathode material comprising:
a) a mixture that includes
   i) at least one of a lithium cobaltate and a lithium nickelate, wherein the lithium is a modified lithium cobaltate, having a lithium modifier and, optionally, a cobalt modifier of the lithium cobaltate, and wherein the lithium modifier is magnesium (Mg), and wherein the cobalt modifier is at least one member of the group consisting of manganese (Mn), aluminum (Al), boron (B), titanium (Ti), magnesium (Mg), calcium (Ca) and strontium (Sr), and wherein the lithium nickelate is selected from the group consisting of $Li(Ni_{1/3}Co_{1/3}Mn_{1/3})O_2$; a lithium nickelate that includes at least one Li atom modifier selected from the group consisting of barium, magnesium, calcium and strontium; and a lithium nickelate represented by an empirical formula of $Li_{x3}Ni_{(1-z3)}M'_{z3}O_2$ coated with $LiCoO_2$ as a gradient coating or a spot-wise coating where:
      x3 is greater than 0.05 and less than 1.2,
      z3 is greater than 0 and less than 0.5, and
      M' is at least one member of the group consisting of cobalt, manganese, aluminum, boron, titanium, magnesium, calcium and strontium; and
   ii) at least one of a manganate spinel and an olivine compound, wherein the manganate spinel is represented by an empirical formula of $Li_{(1+x1)}(Mn_{1-y1}A'_{y1})_{2-x1}O_{z1}$ where:
      x1 is equal to or greater than 0.01 and equal to or less than 0.3,
      y1 is greater than 0.0 and equal to or less than 0.3,
      z1 is equal to or greater than 3.9 and equal to or less than 4.1, and
      A' is at least one member of the group consisting of magnesium, aluminum, cobalt, nickel and chromium,
   and wherein the olivine compound is represented by an empirical formula of $Li_{(1-x2)}A''_{x2}MPO_4$ where:
      x2 is equal to or greater than 0.05 and equal to or less than 0.2, or x2 is equal to or greater than 0.0 and equal to or less than 0.1,
      M is at least one member of the group consisting of iron, manganese, cobalt and magnesium, and
      A'' is at least one member of the group consisting of sodium, magnesium, calcium, potassium, nickel and niobium; or
b) a mixture that includes
   i) a lithium nickelate selected from the group consisting of $Li(Ni_{1/3}Co_{1/3}Mn_{1/3})O_2$; a lithium nickelate that includes at least one Li atom modifier selected from the group consisting of barium, magnesium, calcium and strontium; and a lithium nickelate represented by an empirical formula of $Li_{x3}Ni_{(1-z3)}M'_{z3}O_2$ coated with $LiCoO_2$ as a gradient coating or a spot-wise coating where:
      x3 is greater than 0.05 and less than 1.2,
      z3 is greater than 0 and less than 0.5, and
      M' is at least one member of the group consisting of cobalt, manganese, aluminum, boron, titanium, magnesium, calcium and strontium; and
   ii) a manganate spinel represented by an empirical formula of $Li_{(1+x7)}Mn_{2-y7}O_{z7}$ where x7 and y7 are each independently equal to or greater than 0.0 and equal to or less than 1.0; and z7 is equal to or greater than 3.9 and equal to or less than 4.2.

22. A battery pack comprising a plurality of cells, wherein each of the cells includes an active cathode material that includes:
a) a mixture that includes
   i) at least one of a lithium cobaltate and a lithium nickelate, wherein the lithium cobaltate is a modified lithium cobaltate, a lithium modifier and, optionally, a cobalt modifier of the lithium cobaltate, and wherein the lithium modifier is magnesium (Mg), and wherein the cobalt modifier is at least one member of the group consisting of manganese (Mn), aluminum (Al), boron (B), titanium (Ti), magnesium (Mg), calcium (Ca) and strontium (Sr), and wherein the lithium nickelate is selected from the group consisting of $Li(Ni_{1/3}$ $Co_{1/3}Mn_{1/3})O_2$; a lithium nickelate that includes at least one Li atom modifier selected from the group consisting of barium, magnesium, calcium and strontium; and a lithium nickelate represented by an empirical formula of $Li_{x3}Ni_{(1-z3)}M'_{z3}O_2$ coated with $LiCoO_2$ as a gradient coating or a spot-wise coating where:

x3 is greater than 0.05 and less than 1.2, z3 is greater than 0 and less than 0.5, and M' is at least one member of the group consisting of cobalt, manganese, aluminum, boron, titanium, magnesium, calcium and strontium; and ii) at least one of a manganate spinel and an olivine compound, wherein the manganate spinel is represented by an empirical formula of $Li_{(1+x1)}(Mn_{1-y1}A'_{y1})_{2-x1}O_{z1}$ where:

x1 is equal to or greater than 0.01 and equal to or less than 0.3, y1 is greater than 0.0 and equal to or less than 0.3, z1 is equal to or greater than 3.9 and equal to or less than 4.1, and A' is at least one member of the group consisting of magnesium, aluminum, cobalt, nickel and chromium, and wherein the olivine compound is represented by an empirical formula of $Li_{(1-x2)}A''_{x2}MPO_4$ where:

x2 is equal to or greater than 0.05 and equal to or less than 0.2, or x2 is equal to or greater than 0.0 and equal to or less than 0.1, M is at least one member of the group consisting of iron, manganese, cobalt and magnesium, and A'' is at least one member of the group consisting of sodium, magnesium, calcium, potassium, nickel and niobium; or b) a mixture that includes i) a lithium nickelate selected from the group consisting of $Li(Ni_{1/3}Co_{1/3}Mn_{1/3})O_2$; a lithium nickelate that includes at least one Li atom modifier selected from the group consisting of barium, magnesium, calcium and strontium; and a lithium nickelate represented by an empirical formula of $Li_{x3}Ni_{(1-z3)}M'_{z3}O_2$ coated with $LiCoO_2$ as a gradient coating or a spot-wise coating where:

x3 is greater than 0.05 and less than 1.2, z3 is greater than 0 and less than 0.5, and M' is at least one member of the group consisting of cobalt, manganese, aluminum, boron, titanium, magnesium, calcium and strontium; and ii) a manganate spinel represented by an empirical formula of $Li_{(1+x7)}Mn_{2-y7}O_{z7}$ where x7 and y7 are each independently equal to or greater than 0.0 and equal to or less than 1.0; and z7 is equal to or greater than 3.9 and equal to or less than 4.2.

23. A system comprising a portable electronic device and a battery pack that includes a plurality of cells, wherein each of the cells includes an active cathode material that includes:

a) a mixture that includes i) at least one of a lithium cobaltate and a lithium nickelate, wherein the lithium cobaltate is a modified lithium cobaltate, a lithium modifier and, optionally, a cobalt modifier of the lithium cobaltate, and wherein the lithium modifier is magnesium (Mg) and wherein the cobalt modifier is at least one member of the group consisting of manganese (Mn), aluminum (Al), boron (B), titanium (Ti), magnesium (Mg), calcium (Ca) and strontium (Sr), and wherein the lithium nickelate is selected from the group consisting of $Li(Ni_{1/3}Co_{1/3}Mn_{1/3})O_2$; —a lithium nickelate that includes at least one Li atom modifier selected from the group consisting of barium, magnesium, calcium and strontium; and a lithium nickelate represented by an empirical formula of $Li_{x3}Ni_{(1-z3)}M'_{z3}O_2$ coated with $LiCoO_2$ as a gradient coating or a spot-wise coating where:

x3 is greater than 0.05 and less than 1.2, z3 is greater than 0 and less than 0.5, and M' is at least one member of the group consisting of cobalt, manganese, aluminum, boron, titanium, magnesium, calcium and strontium; and ii) at least one of a manganate spinel and an olivine compound, wherein the manganate spinel is represented by an empirical formula of $Li_{(1+x1)}(Mn_{1-y1}A'_{y1})_{2-x1}O_{z1}$ where:

x1 is equal to or greater than 0.01 and equal to or less than 0.3, y1 is greater than 0.0 and equal to or less than 0.3, z1 is equal to or greater than 3.9 and equal to or less than 4.1, and A' is at least one member of the group consisting of magnesium, aluminum, cobalt, nickel and chromium, and wherein the olivine compound is represented by an empirical formula of $Li_{(1-x2)}A''_{x2}MPO_4$ where:

x2 is equal to or greater than 0.05 and equal to or less than 0.2, or x2 is equal to or greater than 0.0 and equal to or less than 0.1, M is at least one member of the group consisting of iron, manganese, cobalt and magnesium, and A'' is at least one member of the group consisting of sodium, magnesium, calcium, potassium, nickel and niobium; or b) a mixture that includes i) a lithium nickelate selected from the group consisting of $Li(Ni_{1/3}Co_{1/3}Mn_{1/3})O_2$; a lithium nickelate that includes at least one Li atom modifier selected from the group consisting of barium, magnesium, calcium and strontium; and a lithium nickelate represented by an empirical formula of $Li_{x3}Ni_{(1-z3)}M'_{z3}O_2$ coated with $LiCoO_2$ as a gradient coating or a spot-wise coating where:

x3 is greater than 0.05 and less than 1.2, z3 is greater than 0 and less than 0.5, and M' is at least one member of the group consisting of cobalt, manganese, aluminum, boron, titanium, magnesium, calcium and strontium; and ii) a manganate spinel represented by an empirical formula of $Li_{(1+x7)}Mn_{2-y7}O_{z7}$ where x7 and y7 are each independently equal to or greater than 0.0 and equal to or less than 1.0; and z7 is equal to or greater than 3.9 and equal to or less than 4.2.

\* \* \* \* \*